United States Patent
Cavallaro et al.

(10) Patent No.: US 11,907,018 B2
(45) Date of Patent: *Feb. 20, 2024

(54) ELECTRONIC DEVICES WITH SLIDING DEVICE HOUSINGS AND TRANSLATING FLEXIBLE DISPLAYS AND CORRESPONDING METHODS

(71) Applicant: Motorola Mobility LLC, Chicago, IL (US)

(72) Inventors: Alberto R. Cavallaro, Northbrook, IL (US); Yong-Ho Lim, Kildeer, IL (US); Daniel P. Groebe, Lake Zurich, IL (US)

(73) Assignee: Motorola Mobility LLC, Chicago, IL (US)

( * ) Notice: Subject to any disclaimer, the term of this patent is extended or adjusted under 35 U.S.C. 154(b) by 194 days.

This patent is subject to a terminal disclaimer.

(21) Appl. No.: 17/459,774

(22) Filed: Aug. 27, 2021

(65) Prior Publication Data
US 2023/0063858 A1    Mar. 2, 2023

(51) Int. Cl.
*G06F 1/16*    (2006.01)
*H04M 1/02*    (2006.01)

(52) U.S. Cl.
CPC .......... *G06F 1/1652* (2013.01); *G06F 1/1681* (2013.01)

(58) Field of Classification Search
CPC .... G06F 1/1652; G06F 1/1681; G06F 1/1679; G06F 1/1656; G06F 1/1624; H04M 1/0268; H04M 1/0237
See application file for complete search history.

(56) References Cited

U.S. PATENT DOCUMENTS 6,242,827 B1    6/2001   Wolf
7,310,050 B2    12/2007  Yeh
(Continued)

FOREIGN PATENT DOCUMENTS

CN    112272248 B  *  5/2022   .......... H04M 1/0235
CN    113472925 B  *  9/2023
(Continued)

OTHER PUBLICATIONS

"Samsung Rollable Display Devicew itht Fingerprint Sensor", Lets Go Digital; Viewed online at https://en.letsgodigital.org/foldable-devices/samsung-rollable-tablet-display/ Feb. 3, 2022; Unknown publication date but prior to filing of present application.
(Continued)

*Primary Examiner* — Mohammed Rachedine
(74) *Attorney, Agent, or Firm* — Philip H. Burrus, IV

(57) ABSTRACT

An electronic device includes a flexible display and a device housing that defines a translation surface for the flexible display. A support layer is positioned between a portion of the flexible display and the translation surface. A rotor positioned within a curvilinear section of the flexible display causes a linear translation of the support layer across the translation surface by drawing the flexible substrate around the rotor. A flexible support structure can be positioned between the support layer and the flexible display, with the flexible support structure defining a plurality of engagement teeth with ends extending under one or more housing rails to prevent pillowing of the flexible display.

20 Claims, 9 Drawing Sheets

(56) References Cited

U.S. PATENT DOCUMENTS

| | | |
|---|---|---|
| 7,463,238 B2 | 12/2008 | Funkhouser |
| 9,960,635 B2 | 5/2018 | Wilkinson |
| 10,162,387 B2 | 12/2018 | Takayanagi et al. |
| 10,224,740 B2 | 3/2019 | Wilkinson |
| 10,250,064 B2 | 4/2019 | Park |
| 10,431,999 B2 | 10/2019 | Choe |
| 10,448,521 B2 | 10/2019 | Seo et al. |
| 10,684,653 B2 | 6/2020 | Xu et al. |
| 10,747,269 B1 * | 8/2020 | Choi .................... H04M 1/0237 |
| 11,058,018 B1 * | 7/2021 | Yoon ..................... G06F 1/1624 |
| 11,071,218 B2 | 7/2021 | Wittenberg |
| 11,563,835 B2 * | 1/2023 | Lim ...................... G06F 1/1652 |
| 2005/0040962 A1 | 2/2005 | Funkhouser |
| 2006/0176243 A1 * | 8/2006 | Yeh ....................... G06F 1/1624 |
| | | 345/30 |
| 2007/0146243 A1 | 6/2007 | Ou |
| 2017/0170677 A1 | 6/2017 | Park |
| 2017/0187233 A1 | 6/2017 | Wilkinson |
| 2018/0233945 A1 | 8/2018 | Wilkinson |
| 2020/0329572 A1 | 10/2020 | Wittenberg |
| 2021/0044683 A1 | 2/2021 | He et al. |
| 2021/0135151 A1 | 5/2021 | Baek et al. |
| 2021/0181801 A1 | 6/2021 | Yin |
| 2021/0373603 A1 | 12/2021 | Feng |
| 2021/0375165 A1 | 12/2021 | Feng |
| 2022/0046811 A1 | 2/2022 | Kim |
| 2022/0187874 A1 * | 6/2022 | Chun .................. H04M 1/0237 |
| 2022/0240400 A1 | 7/2022 | Zhou |
| 2022/0253103 A1 | 8/2022 | Choi |

FOREIGN PATENT DOCUMENTS

| | | | |
|---|---|---|---|
| EP | 3836522 A1 * | 6/2021 | ........... G06F 1/1652 |
| KR | 20040026558 | 3/2004 | |
| KR | 100578520 | 5/2006 | |
| WO | 2007072234 | 6/2007 | |
| WO | 2019107909 | 6/2019 | |
| WO | 2021015310 | 1/2021 | |
| WO | 2021121118 | 6/2021 | |

OTHER PUBLICATIONS

"USB Rechargeable Motorized Turntable Display", Knowza; Unknown Publication Date but prior to filing of present application; Viewed online Feb. 3, 2022 at https://www.walmart.com/ip/USB-Rechargeable-Motorized-Turntable-Dis...elry-Watch-Digital-Product-Glass-Bag-Models-Collectibles/877280621.

Bui, Hung S., "Non-Final Office Action", U.S. Appl. No. 17/684,201; filed Mar. 1, 2022; dated Mar. 30, 2023.

Davies, Daniel, "GB Search Report", GB2216253.1; dated May 2, 2023.

Wilson, Adrian, "Notice of Allowance", U.S. Appl. No. 17/520,428; filed Nov. 5, 2021; dated Jan. 19, 2023.

Wilson, Adrian S., "NonFinal Office Action", U.S. Appl. No. 17/520,428; filed Nov. 5, 2021; dated Nov. 25, 2022.

Townley, Mandy, "GB Search Report", GB2212048.9; dated Mar. 8, 2023.

* cited by examiner

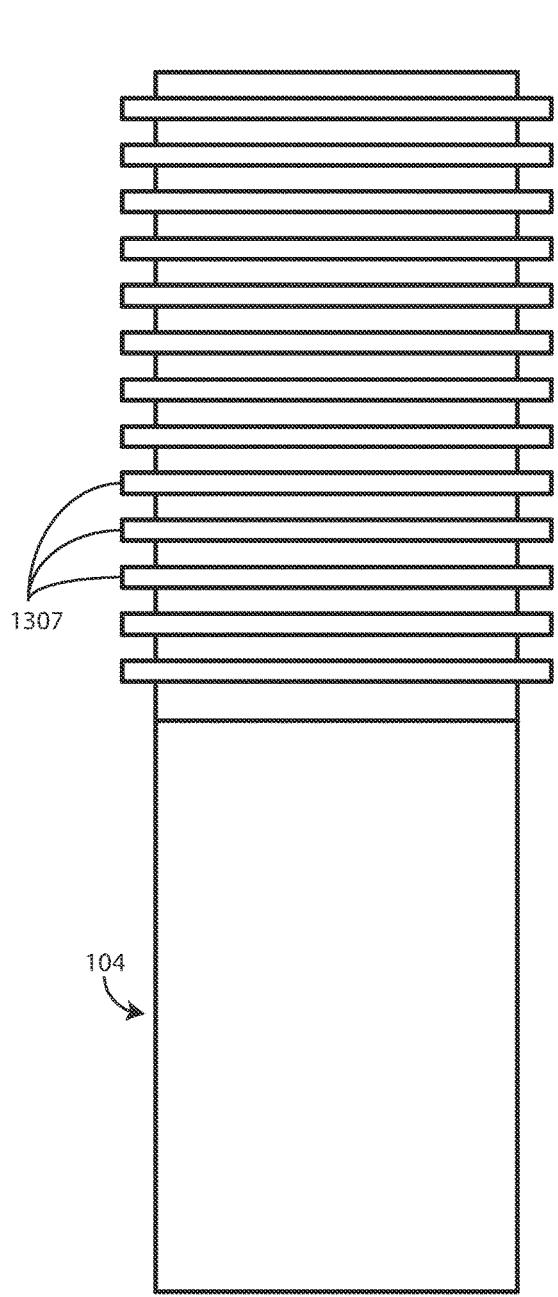 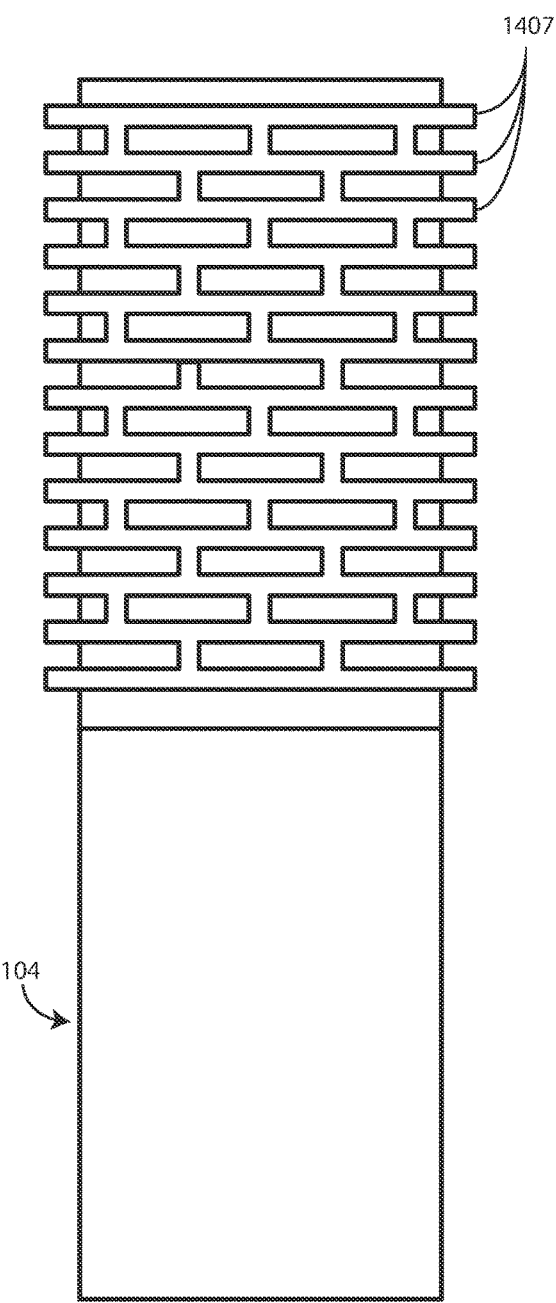
*FIG. 13*     *FIG. 14*

ELECTRONIC DEVICES WITH SLIDING DEVICE HOUSINGS AND TRANSLATING FLEXIBLE DISPLAYS AND CORRESPONDING METHODS

BACKGROUND

Technical Field

This disclosure relates generally to electronic devices, and more particularly to electronic devices having housings that slide relative to each other.

Background Art

Portable electronic communication devices, especially smartphones, have become ubiquitous. People all over the world use such devices to stay connected. These devices have been designed in various mechanical configurations. A first configuration, known as a "candy bar," is generally rectangular in shape, has a rigid form factor, and has a display disposed along a major face of the electronic device. By contrast, a "clamshell" device has a mechanical hinge that allows one housing to pivot relative to the other. A third type of electronic device is a "slider" where one device housing slides relative to the other.

Some consumers prefer candy bar devices, while others prefer clamshell devices. Still others prefer sliders. The latter two types of devices are convenient in that they are smaller in a closed position than in an open position, thereby fitting more easily in a pocket. While clamshell devices are relatively straight forward mechanically, sliding devices are more complicated mechanically and electrically. It would thus be desirable to have an improved electronic device that not only provides a slider construction but a more comfortable tactile experience for the user as well.

BRIEF DESCRIPTION OF THE DRAWINGS

FIG. 13 illustrates a bottom plan view of one explanatory flexible display in accordance with one or more embodiments of the disclosure.

FIG. 14 illustrates a bottom plan view of another explanatory flexible display in accordance with one or more embodiments of the disclosure.

Figure 1:
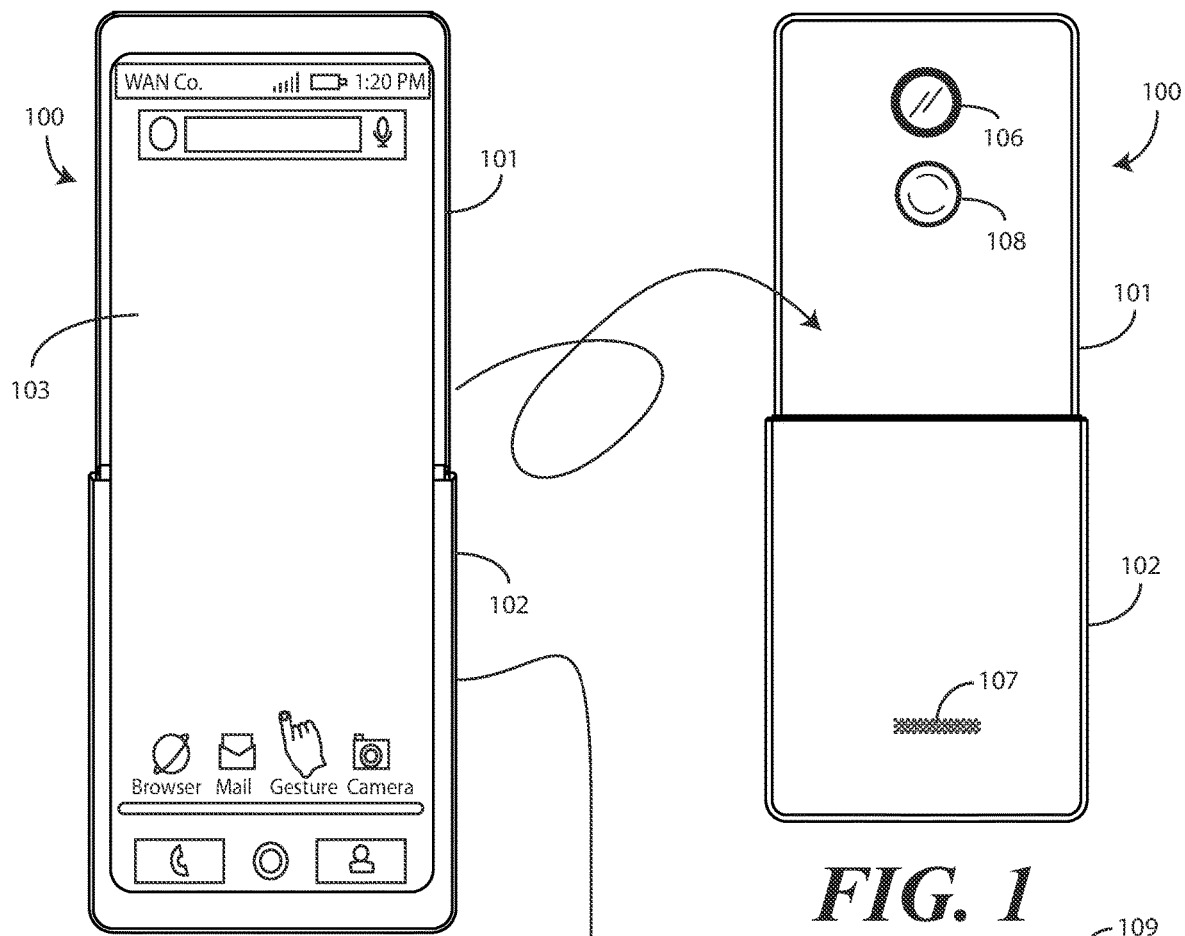
FIG. 1 illustrates one explanatory sliding electronic device in accordance with one or more embodiments of the disclosure.
Figure 1:
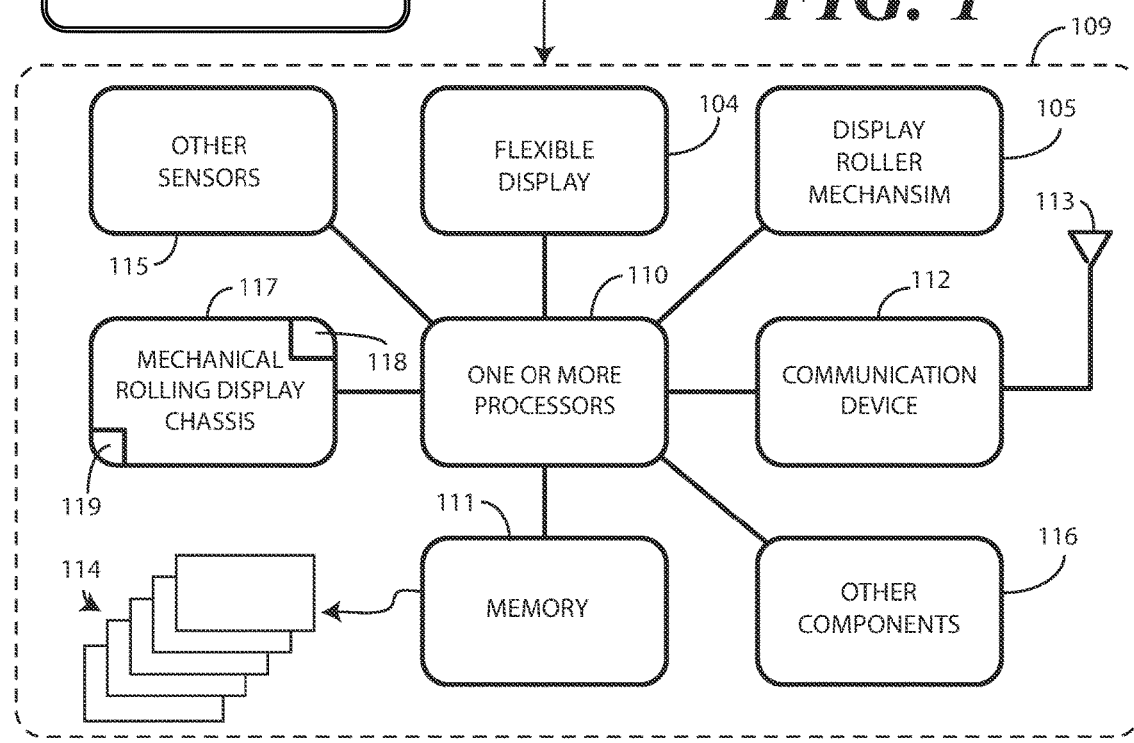

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

DETAILED DESCRIPTION OF THE DRAWINGS

Embodiments of the disclosure are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on."

Relational terms such as first and second, top and bottom, and the like may be used solely to distinguish one entity or action from another entity or action without necessarily requiring or implying any actual such relationship or order between such entities or actions. As used herein, components may be "operatively coupled" when information can be sent between such components, even though there may be one or more intermediate or intervening components between, or along the connection path.

The terms "substantially", "essentially", "approximately", "about" or any other version thereof, are defined as being close to as understood by one of ordinary skill in the art, and in one non-limiting embodiment the term is defined to be within ten percent, in another embodiment within five percent, in another embodiment within one percent and in another embodiment within one-half percent. The term "coupled" as used herein is defined as connected, although not necessarily directly and not necessarily mechanically. Also, reference designators shown herein in parenthesis indicate components shown in a figure other than the one in discussion. For example, talking about a device (10) while discussing figure A would refer to an element, 10, shown in figure other than figure A.

Embodiments of the disclosure provide an electronic device that includes at least a first device housing and a second device housing. In one or more embodiments, the first device housing is configured to slide relative to the second device housing. Illustrating by example, in one explanatory embodiment, the first device housing slides into and out of the second device housing to change an overall length of the sliding electronic device. In other embodiments, the second device housing can slide into and out of the first device housing to achieve the same result. Accordingly, in one or more embodiments a sliding electronic device includes a first device housing and a second device housing that slide relative to each other to transition between a closed position, an open position, and a plurality of partially open positions therebetween.

In one or more embodiments, a flexible display is coupled to the first device housing and the second device housing. The flexible display engages a rotor in one device housing.

When the first device housing and second device housing slide relative to each other, the flexible display wraps around the rotor to extend further from, or back into, the device housing in which the rotor is situated. In one or more embodiments, a cross section of the flexible display defines a J-shape with a curved portion of the J-shape wrapped around the rotor and an upper portion of the J-shape passing across a translation surface of the device housing in which the rotor is situated. When the sliding electronic device opens, the upper portion of the J-shape becomes longer as the flexible display wraps around the rotor and extends further out of the device housing. When the sliding electronic device closes, the upper portion of the J-shape becomes shorter as the reverse operation occurs. Thus, when the first device housing translates relative to the second device housing, the flexible display deforms at different locations as it wraps and passes around the rotor.

In one or more embodiments, the rotor not only facilitates the perceived "extension" of the flexible display that occurs during an opening operation, but also works to improve the reliability and usability of the flexible display. This is true because the rotor defines a service loop about which the flexible display curves. The service loop prevents the flexible display from being damaged or developing memory in the folded position when the electronic device is in the closed position.

In one or more embodiments, the flexible display comprises an assembly that includes a foldable substrate, a foldable display, and a fascia layer, as well as one or more adhesive layers to couple these components together. Embodiments of the disclosure contemplate that some of these layers are stiffer than others, while other layers are softer than others. For example, in one or more embodiments the foldable substrate is manufactured from stainless steel, while the adhesive layer is an optically transparent adhesive measuring only about fifty microns in thickness. The stainless steel layer is stiffer than the adhesive layer, while the adhesive layer is softer than the stainless steel layer. Similarly, the foldable display may be softer than the stainless steel, yet stiffer than the adhesive layer, and so forth.

Embodiments of the disclosure contemplate that these differing stiffness layers can cause the flexible display to not bend with as tight a bending radius as would be desirable under a given set of loading forces. Said differently, for a given set of loading forces applied to the flexible display by the rotor and the connections to the first device housing and the second device housing, the flexible display may not bend sufficiently around desired radiuses so as to be positioned where desired when the electronic device is in the open position, the closed position, or there between. Illustrating by example, when the electronic device is in any of these positions, the portion of the flexible display extending from the rotor may not extend tangentially from the top of the rotor. This causes a "pillowing" effect where a portion of the flexible display bulges from the electronic device.

While a spring-loaded plate can be used to apply even more tension to one end of the flexible display to compensate for the pillowing effect, embodiments of the disclosure contemplate that this solution can cause the flexible display to "feel" like its moving when a user is delivering user input to the flexible display. Said differently, when delivering user input to the portion of the flexible display that pillows, even with a spring-loaded plate a user may feel the flexible display moving up and down slightly. Applying even more tension can deleteriously damage the flexible display itself.

Advantageously, embodiments of the disclosure provide an improved sliding mechanism for a flexible display in a sliding electronic device that eliminates the need for any spring-loaded plate. Flexible display and rotor sliding assemblies configured in accordance with embodiments of the disclosure maintain a flat upper portion of the J-shape while preserving the operability and functionality of the flexible display during sliding operations. Embodiments of the disclosure additionally prevent the application of elevated mechanical strains and stresses to the various layers of the flexible display. When the sliding operation is cycled numerous times, these elevated mechanical strains and stresses can cause mechanical failure in one or more of the layers of the flexible display. Advantageously, embodiments of the disclosure prevent this from occurring.

In one or more embodiments, an electronic device includes a first device housing that is configured to slide relative to a second device housing between a closed position and an open position. A flexible display is coupled to the first device housing and the second device housing and translates along a translation surface defined by one or both of the first device housing and the second device housing.

In one or more embodiments, a flexible support structure is coupled to the flexible display between the flexible display and the translation surface. In one or more embodiments, the flexible support structure defines a plurality of engagement teeth along a first portion of the flexible support structure. In one or more embodiments, each of the engagement teeth of the plurality of engagement teeth extend beyond a width of the flexible display. The ends of these engagement teeth then extend under one or more housing rails positioned at the sides of the flexible display to retain the central portions of the engagement teeth abutting the translation surface. This causes the flexible display itself to remain flat across this portion of the flexible support structure.

In one or more embodiments, a rotor engages the first portion of the flexible support structure. By positioning the ends of the engagement teeth under the one or more housing rails, the flexible display is prevented from pillowing when the rotor rotates, thereby causing translation of the flexible display along the translation surface.

In one or more embodiments, a rigid support layer is then coupled to a second portion of the flexible support structure between the flexible support structure and the translation surface. In one or more embodiments, the rigid support layer is a portion of, or fixedly coupled to, a device housing. When the rotor rotates to draw the flexible display along the translation surface, the rigid support layer translates along the translation surface between the flexible support structure and the translation surface itself. In one or more embodiments, this causes the device housing coupled to the rigid support layer to draw toward the device housing in which the rotor is situated. Since the rigid support layer is rigid, the rigid support layer prevents any pillowing of the flexible display during translation. In effect, the first portion of the flexible support structure having the plurality of engagement teeth with ends being held captive by the one or more housing rails keeps a first portion of the flexible display from pillowing, while the rigid support layer prevents the other portion of the flexible display from pillowing. The system further protects the flexible display from damage and extends its mean time between failure from sliding operations as well.

In one or more embodiments, a rollable, flexible circuit is configured with varying support thicknesses across its length. Illustrating by example, if the rollable, flexible circuit comprises a flexible display, the flexible support structure, and the rigid support layer, the flexible support structure can have different thicknesses across its length. It may be thicker, for instance, at portions where the plurality of engagement teeth occur, and thinner at portions that are coupled to the rigid support layer such that the rigid support layer can be positioned between the flexible support structure and the translation surface of a device housing.

In one or more embodiments, the flexible support structure is manufactured as a composite structure from different components. For instance, a portion of the flexible support structure coupled to the display may be manufactured from a flexible material such as a flexible film, while the plurality of engagement teeth are manufactured from a rigid material such as metal or plastic. In other embodiments, the flexible support structure is a unitary component manufactured from a flexible thermoplastic with the plurality of engagement teeth manufactured by etching. Other configurations for the flexible support structure will be described below. Still others will be obvious to those of ordinary skill in the art having the benefit of this disclosure.

Regardless of construction technique, in one or more embodiments the ends of the plurality of engagement teeth extend laterally from sides of the flexible display and are held captive by a housing rail to keep the flexible display from pillowing. Advantageously, this capture of the teeth and/or use of the rigid support layer with the flexible support structure provides a solution for the pillowing issue that can occur when flexible displays are used in extendable and/or slider mechanisms in portable electronic devices such as smartphones. The pillowing problem is addressed by including a support structure that provides stiffness along the width of the flexible display but still allows the flexible display to flex around the rotor. The advantageous usage of the engagement teeth in one portion of the flexible support structure while a rigid support layer is coupled to another section of the flexible support structure allows the former to be held captive by a rail to prevent pillowing, while the rigid support layer prevents pillowing of any portion of the flexible display that does not wrap around the rotor during the sliding operation. Other advantages offered by embodiments of the disclosure will be described below. Still others will be obvious to those of ordinary skill in the art having the benefit of this disclosure.

Turning now to FIG. 1, illustrated therein is one explanatory electronic device 100 configured in accordance with one or more embodiments of the disclosure. The electronic device 100 of FIG. 1 is a portable electronic device. For illustrative purposes, the electronic device 100 is shown as a smartphone. However, the electronic device 100 could be any number of other devices as well, including tablet computers, gaming devices, multimedia players, and so forth. Still other types of electronic devices can be configured in accordance with one or more embodiments of the disclosure as will be readily appreciated by those of ordinary skill in the art having the benefit of this disclosure.

The electronic device 100 includes a first device housing 101 and a second device housing 102. In one or more embodiments, the first device housing 101 slides relative to the second device housing 102. In the illustrative embodiment of FIG. 1, the first device housing 101 can selectively slide into, and out of, the second device housing 102. However, in other embodiments the opposite will be true, with the second device housing 102 being selectively slidable into and out of the first device housing 101.

In one or more embodiments, one of the first device housing 101 or second device housing 102 includes rails that couple to tracks in the other of the first device housing 101 or the second device housing 102. For instance, the first device housing 101 can have rails that couple to tracks in the second device housing 102. In another embodiment, the first device housing 101 may have a rail and a track, with the second device housing 102 having a complementary rail and track that engage the rail and track of the first device housing 101 to facilitate the sliding operation. Other techniques that allow the first device housing 101 and the second device housing 102 to slide relative to each other between a closed position (shown below in FIG. 3) and the open position of FIG. 1 will be obvious to those of ordinary skill in the art having the benefit of this disclosure.

In one or more embodiments the first device housing 101 and the second device housing 102 are manufactured from a rigid material such as a rigid thermoplastic, metal, or composite material, although other materials can be used. Illustrating by example, in one illustrative embodiment the first device housing 101 and the second device housing 102 are manufactured from aluminum. Still other constructs will be obvious to those of ordinary skill in the art having the benefit of this disclosure.

In the illustrative embodiment of FIG. 1, the electronic device 100 includes a single sliding mechanism where the first device housing 101 slides relative to the second device housing 102. However, in other embodiments two or more sliding mechanisms can be incorporated into the electronic device 100 to allow it to be slide at multiple locations, such as in a telescoping configuration.

This illustrative electronic device 100 of FIG. 1 includes a display 103. The display 103 can optionally be touch-sensitive. Users can deliver user input to the display 103 of such an embodiment by delivering touch input from a finger, stylus, or other objects disposed proximately with the display 103.

In one embodiment, the display 103 is configured as an organic light emitting diode (OLED) display fabricated on a flexible plastic substrate, thereby making the display 103 a flexible display 104. This allows the display 103 to be flexible so as to deform around a display roller mechanism 105, one example of which is a rotor that will be shown and described below with reference to FIG. 5, when the first device housing 101 slides relative to the second device housing 102. When a flexible display 104 is used, in one or more embodiments an OLED is constructed on flexible plastic substrates can allow the flexible display 104 to bend with various bending radii around the display roller mechanism 105.

In one or more embodiments the flexible display 104 may be formed from multiple layers of flexible material such as flexible sheets of polymer or other materials. In this illustrative embodiment, the flexible display 104 is fixedly coupled to the first device housing 101 and extends into the second device housing 102 and around the display roller mechanism 105. The flexible display 104 spans the engagement line at which the first device housing 101 slides into, and out of, the second device housing 102 in this illustrative embodiment.

Features can be incorporated into the first device housing 101 and/or the second device housing 102. Examples of such features include a camera 106 or an optional speaker port 107, which are shown disposed on the rear side of the electronic device 100 in this embodiment but could be placed on the front side as well. In this illustrative embodiment, a user interface component 108, which may be a button, fingerprint sensor, or touch sensitive surface, can also be disposed along the rear side of the first device housing 101. As noted, any of these features are shown being disposed on the rear side of the electronic device 100 in this embodiment, but could be located elsewhere, such as on the front side in other embodiments. In other embodiments, these features may be omitted.

The electronic device 100 can optionally include at least a second display. Illustrating by example, in one embodiment the camera 106 and the user interface component 108 can be moved to the second device housing 102, with a second display being positioned where the camera 106 and user interface component 108 are positioned in FIG. 1. The second display could be coupled to the second device housing 102 as well. In still other embodiments, a second display can be coupled to the first device housing 101, while a third display (not shown) is coupled to the second device housing 102. Thus, electronic devices configured in accordance with embodiments of the disclosure can include displays situated at different positions.

A block diagram schematic 109 of the electronic device 100 is also shown in FIG. 1. The block diagram schematic 109 includes one or more electronic components that can be coupled to a printed circuit board assembly disposed within either or both of the first device housing 101 or the second device housing 102 of the electronic device 100. The components of the block diagram schematic 109 can be electrically coupled together by conductors or a bus disposed along one or more printed circuit boards. For example, some components of the block diagram schematic 109 can be configured as a first electronic circuit fixedly situated within the first device housing 101, while other components of the block diagram schematic 109 can be configured as a second electronic circuit fixedly situated within the second device housing 102. A flexible substrate can then extend from the first electronic circuit in the first device housing 101 to the second electronic circuit in the second device housing 102 to electrically couple the first electronic circuit to the second electronic circuit.

In one or more embodiments, the electronic device 100 includes one or more processors 110. In one embodiment, the one or more processors 110 can include an application processor and, optionally, one or more auxiliary processors. One or both of the application processor or the auxiliary processor(s) can include one or more processors. One or both of the application processor or the auxiliary processor(s) can be a microprocessor, a group of processing components, one or more ASICs, programmable logic, or other type of processing device.

The application processor and the auxiliary processor(s) can be operable with the various components of the electronic device 100. Each of the application processor and the auxiliary processor(s) can be configured to process and execute executable software code to perform the various functions of the electronic device 100. A storage device, such as memory 111, can optionally store the executable software code used by the one or more processors 110 during operation.

In this illustrative embodiment, the electronic device 100 also includes a communication circuit 112 that can be configured for wired or wireless communication with one or more other devices or networks. The networks can include a wide area network, a local area network, and/or personal area network. The communication circuit 112 may also utilize wireless technology for communication, such as, but are not limited to, peer-to-peer or ad hoc communications such as HomeRF, Bluetooth and IEEE 802.11, and other forms of wireless communication such as infrared technology. The communication circuit 112 can include wireless communication circuitry, one of a receiver, a transmitter, or transceiver, and one or more antennas 113.

In one embodiment, the one or more processors 110 can be responsible for performing the primary functions of the electronic device 100. For example, in one embodiment the one or more processors 110 comprise one or more circuits operable with one or more user interface devices, which can include the display 103, to present, images, video, or other presentation information to a user. The executable software code used by the one or more processors 110 can be configured as one or more modules 114 that are operable with the one or more processors 110. Such modules 114 can store instructions, control algorithms, logic steps, and so forth.

In one embodiment, the one or more processors 110 are responsible for running the operating system environment of the electronic device 100. The operating system environment can include a kernel and one or more drivers, and an application service layer, and an application layer. The operating system environment can be configured as executable code operating on one or more processors or control circuits of the electronic device 100. The application layer can be responsible for executing application service modules. The application service modules may support one or more applications or "apps." The applications of the application layer can be configured as clients of the application service layer to communicate with services through application program interfaces (APIs), messages, events, or other inter-process communication interfaces. Where auxiliary processors are used, they can be used to execute input/output functions, actuate user feedback devices, and so forth.

In one embodiment, the one or more processors 110 may generate commands or execute control operations based on information received from the sensors 115 of the electronic device 100. The one or more processors 110 may also generate commands or execute control operations based upon information received from a combination of the one or more sensors 115, the flexible display 104, and/or the other input devices such as the user interface component 108. Alternatively, the one or more processors 110 can generate commands or execute control operations based upon information received from the one or more sensors 115 or the flexible display 104 alone. Moreover, the one or more processors 110 may process the received information alone or in combination with other data, such as the information stored in the memory 111.

The one or more sensors 115 may include a microphone, an earpiece speaker, a second loudspeaker (disposed beneath speaker port 107), and a user interface component 108 such as a button or touch-sensitive surface. The one or more other sensors 115 may also include key selection sensors, proximity sensors, a touch pad sensor, a touch screen sensor, a capacitive touch sensor, and one or more switches. Touch sensors may used to indicate whether any of the user actuation targets present on the display 103 are being actuated. Alternatively, touch sensors disposed in the electronic device 100 can be used to determine whether the electronic device 100 is being touched at side edges or major faces of the first device housing 101 or the second device housing 102. The touch sensors can include surface and/or housing capacitive sensors in one embodiment. The other sensors 115 can also include audio sensors and video sensors (such as the camera 106).

The other sensors 115 can also include motion detectors, such as one or more accelerometers or gyroscopes. For example, an accelerometer may be embedded in the electronic circuitry of the electronic device 100 to show vertical orientation, constant tilt and/or whether the electronic device 100 is stationary. A gyroscope can be used in a similar fashion.

Other components 116 operable with the one or more processors 110 can include output components such as video outputs, audio outputs, and/or mechanical outputs. Examples of output components include audio outputs such as speaker port 107, earpiece speaker, or other alarms and/or buzzers and/or a mechanical output component such as vibrating or motion-based mechanisms. Still other components will be obvious to those of ordinary skill in the art having the benefit of this disclosure.

In one or more embodiments, a mechanical support structure 117 is coupled to the flexible display 104. The mechanical support structure 117 can be configured as a mechanical chassis that allows the flexible display 104 to translate along a translation surface of one or both of the first device housing 101 and/or the second device housing 102 when the first device housing 101 translates relative to the second device housing 102, thereby causing the display roller mechanism 105 to rotate.

The mechanical support structure 117 can include a flexible support structure 118 positioned between the flexible display 104 and the translation surface. The mechanical support structure 117 can further include a support layer 119 positioned between a portion of the flexible display 104 and the translation surface.

In one or more embodiments, the support layer 119 is configured as a rigid, substantially planar support layer that abuts the translation surface both when the electronic device 100 is in the open position or in the closed position. In one or more embodiments, the support layer 119 is a portion of one of either the first device housing 101 or the second device housing 102. Illustrating by example, if the display roller mechanism 105 is situated in the second device housing 102, the support layer 119 can be a portion of, or fixedly coupled to, the first device housing 101. When the display roller mechanism causes the support layer 119 to translate along the translation surface defined by the second device housing 102, this action can cause the first device housing 101 to slide toward, or away from, the second device housing as well. Accordingly, in one or more embodiments an offset between the first device housing 101 and the second device housing is created by engagement of the support layer 119 and the translation surface.

In one or more embodiments, some portions of the flexible support structure 118 abut the translation surface while other portions abut the display roller mechanism 105. Still other portions of the flexible support structure 118 abut the support layer 119, where included. This will be illustrated in more detail in FIGS. 7-10 below.

In one or more embodiments, the mechanical support structure 117 is positioned between the flexible display 104 and the translation surface. The mechanical support structure 117 can be fixedly coupled to the flexible display 104 by an adhesive or other coupling mechanism. Where the mechanical support structure 117 includes a flexible support structure 118, the flexible support structure 118 can define a first section extending from the flexible display 104 to the translation surface and a second section extending from the flexible display 104 to the support layer 119.

In one or more embodiments, the first section of the flexible support structure 118 defines a plurality of engagement teeth. In one or more embodiments, some engagement teeth of the plurality of engagement teeth abut the translation surface, while some other engagement teeth abut the rotor. In one or more embodiments, the second section of the flexible support structure 118 extending from the flexible display 104 to the support layer 119 is devoid of engagement teeth. This too will be illustrated in more detail in FIGS. 7-10 below.

In one or more embodiments, the plurality of engagement teeth are wider than the flexible display 104. One or both of the first device housing 101 and/or the second device housing 102 can include one or more housing rails positioned at sides of the first device housing 101. The ends of the engagement teeth extending from the first portion of the flexible support structure 118 can then be positioned between the housing rails and the translation surface. Advantageously, this allows the one or more housing rails to retain the engagement teeth having their ends positioned under the one or more housing rails against the translation surface as the display roller mechanism 105 rotates.

It is to be understood that FIG. 1 is provided for illustrative purposes only and for illustrating components of one electronic device 100 in accordance with embodiments of the disclosure and is not intended to be a complete schematic diagram of the various components required for an electronic device. Therefore, other electronic devices in accordance with embodiments of the disclosure may include various other components not shown in FIG. 1 or may include a combination of two or more components or a division of a particular component into two or more separate components, and still be within the scope of the present disclosure.

Figure 2:
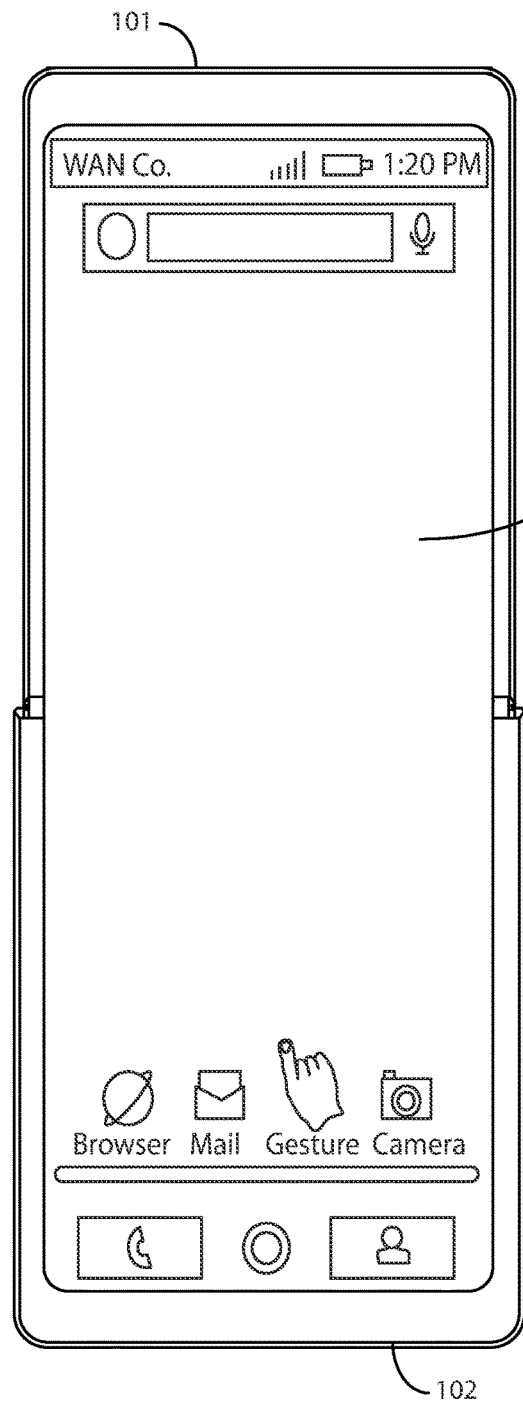
FIG. 2 illustrates one explanatory sliding electronic device in an open position.

Turning now to FIG. 2, illustrated therein is the electronic device 100 in an open position 200. In the axially displaced open position 200, the first device housing 101 slides out of the second device housing 102, thereby revealing the flexible display 104. In such a configuration, the first device housing 101 and the second device housing 102 effectively define a plane. Since this illustrative embodiment includes a flexible display 104, the flexible display 104 has been elongated into a flat position.

Figure 3:
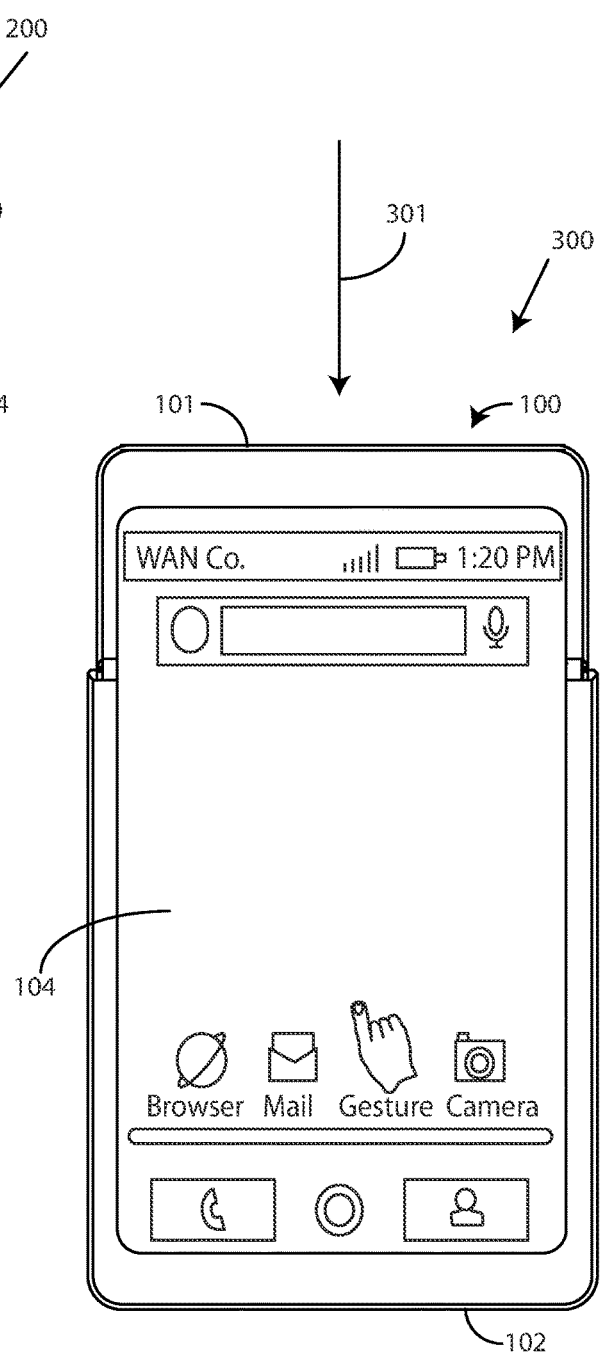
FIG. 3 illustrates one explanatory sliding electronic device in a closed position.

Turning now to FIG. 3, illustrated therein is the electronic device 100 in a closed state. In this state, the first device housing 101 slides 301 into the second device housing 102 toward the second device housing 102 to a closed position 300. This causes the overall length of the electronic device 100 to get shorter. Additionally, the flexible display 104 inserts into the second device housing 102 by passing around the display roller mechanism (105) and becoming concealed within the second device housing 102. When the electronic device 100 opens again, the concealed portions of the flexible display 104 are again revealed.

In some embodiments, features can be included to further retain the electronic device 100 in the closed position 300. Illustrating by example, in another embodiment, a mechanical latch can be included to retain the first device housing 101 and the second device housing 102 in the closed position 300. In still another embodiment, magnets can be incorporated into the first device housing 101 and the second device housing 102. For instance, magnets can be placed in the first device housing 101 and the second device housing 102 to retain the first device housing 101 and the second device housing 102 in the closed position 300.

In still other embodiments, frictional elements can be incorporated into the mechanical interface existing between the first device housing 101 and the second device housing 102 to retain the first device housing 101 and the second device housing 102 in a particular position. A stator motor could be integrated into electronic device 100 to drive the first device housing 101 and second device housing 102 together and apart as well. Still other mechanical structures and devices suitable for retaining the electronic device 100 in the closed position 300 will be obvious to those of ordinary skill in the art having the benefit of this disclosure.

Figure 4:
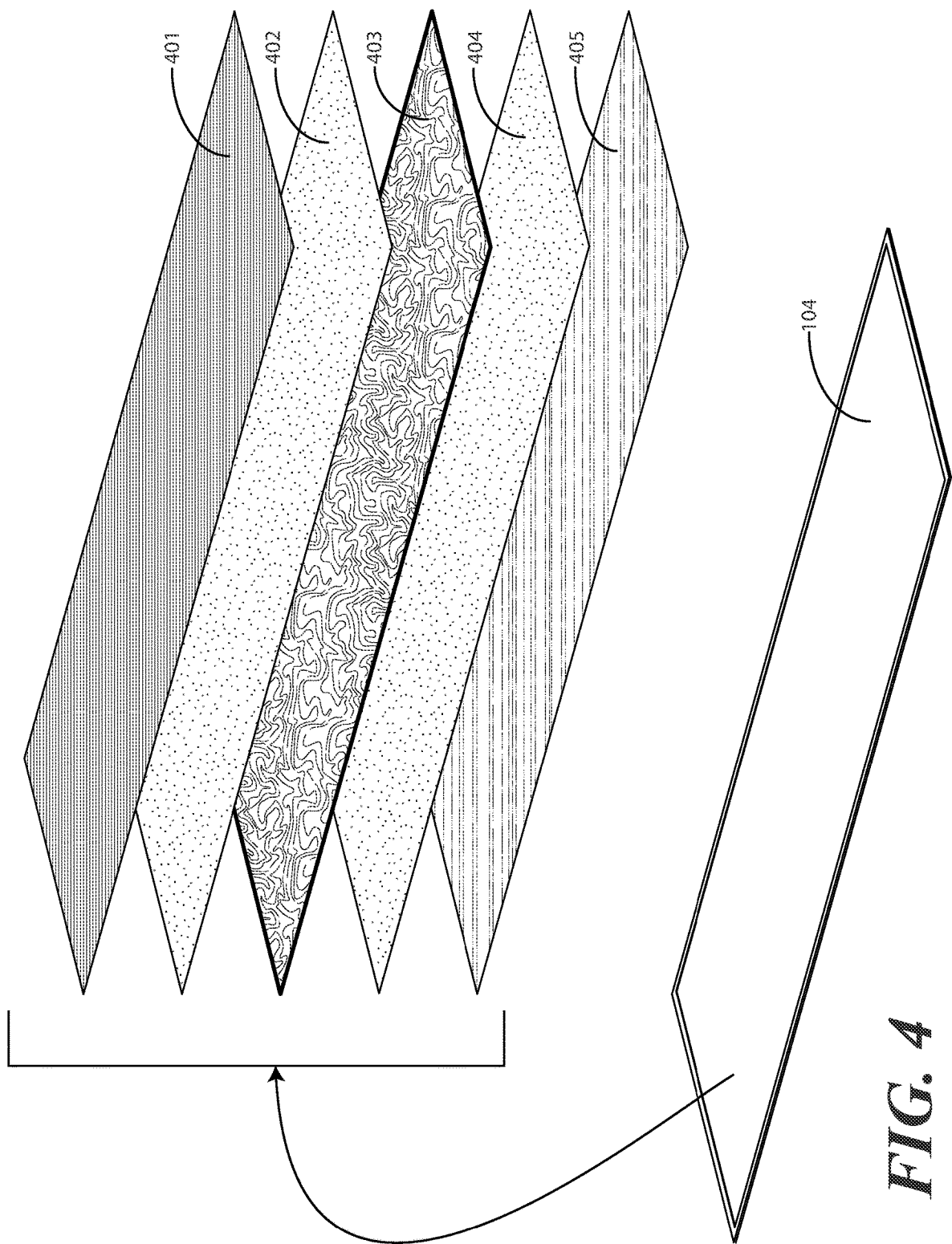
FIG. 4 illustrates an exploded view of one explanatory flexible display in accordance with one or more embodiments of the disclosure.

Turning now to FIG. 4, illustrated therein is one example of a flexible display 104 configured in accordance with one or more embodiments of the disclosure. As shown in FIG. 4, in one or more embodiments the flexible display 104 comprises one or more layers that are coupled or laminated together to complete the flexible display 104. In one or more embodiments, these layers comprise a flexible protective cover 401, a first adhesive layer 402, a flexible display layer 403, a second adhesive layer 404, and a flexible substrate 405. Other configurations of layers suitable for manufacturing the flexible display 104 will be obvious to those of ordinary skill in the art having the benefit of this disclosure.

Beginning from the top of the layer stack, in one or more embodiments the flexible protective cover 401 comprises an optically transparent substrate. In one or more embodiments the flexible protective cover 401 may be manufactured from an optically transparent material such a thin film sheet of a thermoplastic material. Illustrating by example, in one embodiment the flexible protective cover 401 is manufactured from a layer of optically transparent polyamide having a thickness of about eighty microns. In another embodiment, the flexible protective cover 401 is manufactured from a layer of optically transparent polycarbonate having a thickness of about eighty microns. Other materials suitable for manufacturing the flexible protective cover 401 will be obvious to those of ordinary skill in the art having the benefit of this disclosure.

In one or more embodiments the flexible protective cover 401 functions as a fascia by defining a cover for the flexible display layer 403. In one or more embodiments the flexible protective cover 401 is optically transparent, in that light can pass through the flexible protective cover 401 so that objects behind the flexible protective cover 401 can be distinctly seen. The flexible protective cover 401 may optionally include a ultra-violet barrier. Such a barrier can be useful in improving the visibility of flexible display layer 403 in one or more embodiments.

Beneath the flexible protective cover 401 is a first adhesive layer 402. In one or more embodiments, the first adhesive layer 402 comprises an optically transparent adhesive. The optically transparent adhesive can be applied to two sides of a thin, optically transparent substrate such that the first adhesive layer 402 functions as an optically transparent layer having optically transparent adhesive on both sides. Where so configured, in one or more embodiments the first adhesive layer 402 has a thickness of about fifty microns. This optically transparent version of "double-sided tape" can then be spooled and applied between the flexible protective cover 401 and the flexible display layer 403 to couple the two together.

In other embodiments the first adhesive layer 402 will instead be applied between the flexible protective cover 401 and the flexible display layer 403 as an optically transparent liquid, gel, as a homogeneous adhesive layer, or in the form of another medium. Where so configured, the first adhesive layer 402 can optionally be cured by heat, ultraviolet light, or other techniques. Other examples of materials suitable for use as the first adhesive layer 402 will be obvious to those of ordinary skill in the art having the benefit of this disclosure. In one or more embodiments, the first adhesive layer 402 mechanically couples the flexible display layer 403 to the flexible protective cover 401.

In one or more embodiments, the flexible display layer 403 is situated between the flexible substrate 405 and the flexible protective cover 401. In other embodiments, a layer above the flexible display layer 403 can be configured with enough stiffness to make the flexible substrate 405 unnecessary. For example, in an embodiment where the flexible protective cover 401 is configured with enough stiffness to retain the flexible display 104 in the proper shape, the flexible substrate 405 may be omitted.

The flexible display layer 403 can optionally be touch-sensitive. In one or more embodiments, the flexible display layer 403 is configured as an organic light emitting diode (OLED) display layer coupled to the flexible substrate 405, which allows the flexible display layer 403 to bend in accordance with various bending radii. For example, some embodiments allow bending radii of between thirty and six hundred millimeters. Other substrates allow bending radii of around five millimeters to provide a display that is foldable through active bending. Other displays can be configured to accommodate both bends and folds.

In one or more embodiments the flexible display layer 403 may be formed from multiple layers of flexible material such as flexible sheets of polymer or other materials. Illustrating by example, the flexible display layer 403 can include a layer of optically pellucid electrical conductors, a polarizer layer, one or more optically transparent substrates, and layers of electronic control circuitry such as thin film transistors to actuate pixels and one or more capacitors for energy storage. In one or more embodiments, the flexible display layer 403 has a thickness of about 130 microns.

In one or more embodiments, so as to be touch sensitive, the flexible display layer 403 includes a layer including one or more optically transparent electrodes. In one or more embodiments, the flexible display layer 403 includes an organic light emitting diode layer configured to images and other information to a user. The organic light emitting diode layer can include one or more pixel structures arranged in an array, with each pixel structure comprising a plurality of electroluminescent elements such as organic light emitting diodes. These various layers can be coupled to one or more optically transparent substrates of the flexible display layer 403. Other layers suitable for inclusion with the flexible display layer 403 will be obvious to those of ordinary skill in the art having the benefit of this disclosure.

In one or more embodiments, the flexible display layer 403 is coupled to the flexible substrate 405 by a second adhesive layer 404. In one or more embodiments, to simplify manufacture, the second adhesive layer 404 is identical to the first adhesive layer 402 and comprises an optically transparent adhesive. However, since the second adhesive layer 404 is coupled between the flexible display layer 403 and the flexible substrate 405, i.e., under the flexible display layer 403, an optically transparent adhesive is not a requirement. The second adhesive layer 404 could be partially optically transparent or not optically transparent at all in other embodiments.

Regardless of whether the second adhesive layer 404 is optically transparent, in one or more embodiments the adhesive of the second adhesive layer 404 is applied to two sides of a thin, flexible substrate. Where so configured, in one or more embodiments the second adhesive layer 404 has a thickness of about fifty microns. This extremely thing version of "double-sided tape" can then be spooled and applied between the flexible display layer 403 and the flexible substrate 405 to couple the two together.

In other embodiments, as with the first adhesive layer 402, the second adhesive layer 404 will instead be applied between the flexible display layer 403 and the foldable substrate as a liquid, gel, as a homogeneous layer, or in the form of another medium. Where so configured, the second adhesive layer 404 can optionally be cured by heat, ultraviolet light, or other techniques. Other examples of materials suitable for use as the second adhesive layer 404 will be obvious to those of ordinary skill in the art having the benefit of this disclosure.

In one or more embodiments, the flexible display 104 comprises a flexible substrate 405. In one or more embodiments the flexible substrate is coupled to the flexible display layer 403 and defines a mechanical support for the flexible display layer 403 due to the fact that the flexible substrate 405 is the stiffest layer of the flexible display 104. In one or more embodiments the flexible substrate 405 is manufactured from stainless steel with a thickness of about forty microns. In another embodiment, the flexible substrate 405 is manufactured from a flexible plastic. Other materials from which the flexible substrate 405 can be manufactured will be obvious to those of ordinary skill in the art having the benefit of this disclosure.

Embodiments of the disclosure contemplate that some of the layers comprising the flexible display 104 are stiffer than others. Similarly, other layers of the flexible display 104 are softer than others. For example, where the flexible substrate 405 is manufactured from stainless steel, this layer is stiffer than either the first adhesive layer 402 or the second adhesive layer 404. In one or more embodiments, the stainless steel is stiffer than the flexible display layer 403 as well. In one or more embodiments, the flexible substrate 405 is the stiffest layer in the flexible display 104 while the first adhesive layer 402 and the second adhesive layer 404 are the softest layers of the flexible display 104. The flexible protective cover 401 and the flexible display layer 403 have a stiffness that falls between that of the flexible substrate 405 and the adhesive layers in one or more embodiments.

In one or more embodiments, the various layers of the flexible display 104 are laminated together in a substantially planar configuration. Said differently, in one or more embodiments the flexible substrate 405 is configured as a substantially planar substrate. The second adhesive layer 404 can be attached to this substantially planar substrate, with the flexible display layer 403 then attached to the second adhesive layer 404. The first adhesive layer 402 can be attached to the flexible display layer 403, with the flexible protective cover 401 attached to the first adhesive layer 402. To ensure proper coupling, the resulting flexible display layer 403 can be cured, such as in an autoclave at a predefined temperature for a predefined duration. Where employed, such curing allows any air bubbles or other imperfections in the various layers to be corrected. In one or more embodiments, since the flexible substrate 405 is configured as a substantially planar substrate, the resulting flexible display 104 is substantially planar as well.

Figure 5:
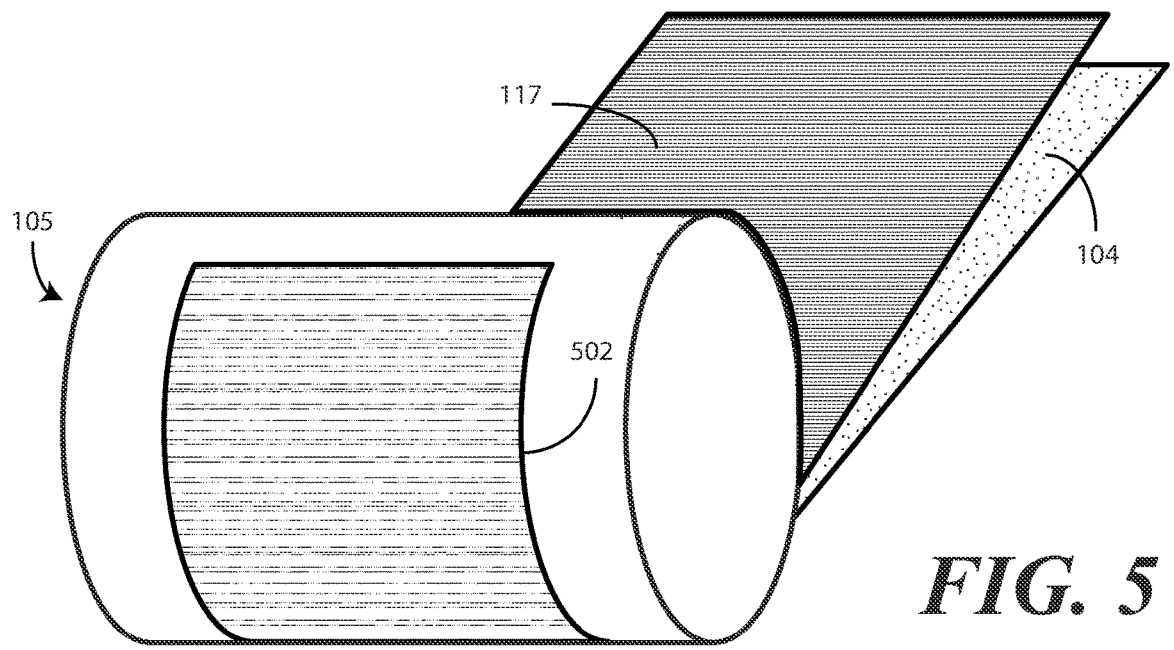
FIG. 5 illustrates one explanatory flexible display and rotor assembly configured in accordance with one or more embodiments of the disclosure.

Turning now to FIG. 5, illustrated therein is one explanatory display assembly configured for a sliding electronic device in accordance with one or more embodiments of the disclosure. As described above, in one or more embodiments a mechanical support structure 117 is coupled to the flexible display 104. While shown with its end separated from the flexible display 104 in FIG. 5 so that the components can be more clearly seen, in one or more embodiments the mechanical support structure 117 is fixedly coupled to the entirety of the flexible display 104. The mechanical support structure 117 serves as a mechanical chassis that allows the flexible display 104 to translate along a translation surface of a device housing of an electronic device configured as a sliding electronic device.

In the illustrative embodiment of FIG. 5, the flexible display 104 and mechanical support structure 117 wrap around a display roller mechanism 105. In this illustrative embodiment, the display roller mechanism 105 includes a rotor 501 that is positioned within a curvilinear section 502 of the flexible display 104. When placed within a device housing of a sliding electronic device, rotation of the rotor 501 causes a linear translation of the flexible display 104 and mechanical support structure 117 across a translation surface of the device housing by drawing the flexible display 104 and the mechanical support structure 117 around the rotor 501.

Figure 6:
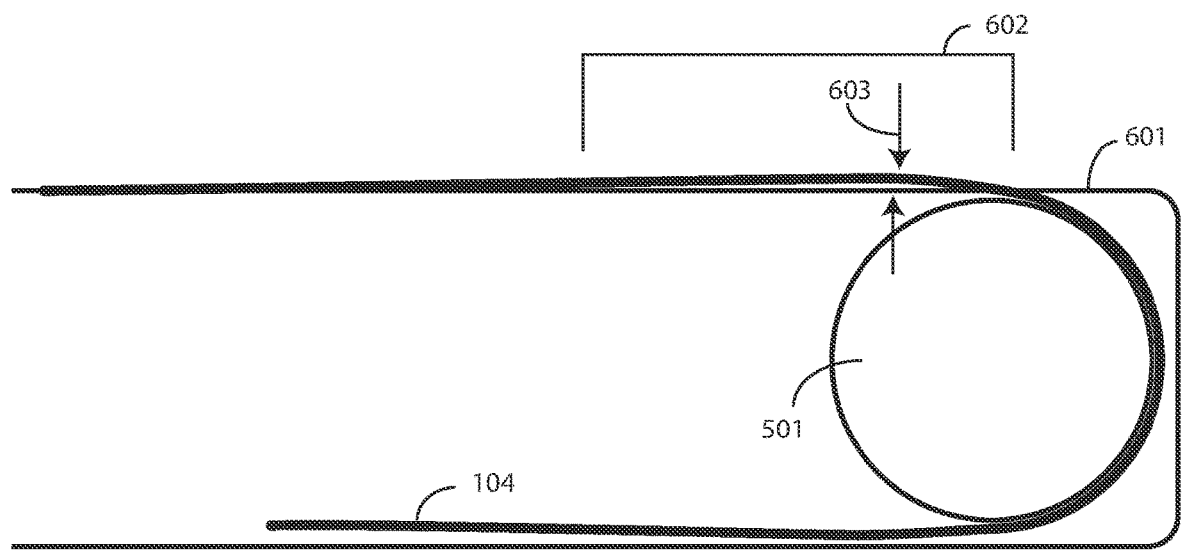
FIG. 6 illustrates one explanatory flexible display and rotor assembly situated within a device housing in accordance with one or more embodiments of the disclosure.

Turning now to FIG. 6, illustrated therein is a device housing 601 of a sliding electronic device with the rotor 501 and the flexible display 104 positioned therein. For illustrative purposes, the system of FIG. 6 excludes the mechanical support structure (117). As described above with reference to FIG. 4, the flexible display 104 can include layers of differing stiffnesses. These differing stiffness layers can cause the flexible display 104 to not bend with as tight a bending radius as would be desirable under a given set of loading forces. Said differently, for a given set of loading forces applied to the flexible display 104 by the rotor 501 and the connections to the device housing 601 and the other device housing of the sliding electronic device to which the device housing 601 is connected, the flexible display 104 may not bend sufficiently around desired radiuses so as to be positioned where desired when the electronic device is in the open position, the closed position, or there between.

Illustrating by example, when the electronic device is in any of these positions, a portion 602 of the flexible display 104 extending distally from the rotor 501 may not extend tangentially from the top of the rotor 501. This causes a "pillowing" effect 603 where that portion 602 of the flexible display 104 bulges from the device housing 601 of electronic device.

While a spring-loaded plate can be used to apply even more tension to one end of the flexible display to compensate for the pillowing effect, embodiments of the disclosure contemplate that this solution can cause the flexible display 104 to "feel" like its moving when a user is delivering user input to the flexible display 104, especially along the portion 602 of the first device housing 101 that is experiencing the pillowing effect. Said differently, when delivering user input to the portion 602 of the flexible display 104 experiencing the pillowing effect 603, even with a spring-loaded plate a user may feel the flexible display 104 moving up and down slightly relative to the device housing 601. Applying even more tension can deleteriously damage the flexible display 104 itself.

Advantageously, embodiments of the disclosure provide an improved sliding mechanism for a flexible display in a sliding electronic device that eliminates the need for any spring-loaded plate while eliminating the pillowing effect 603. Flexible display and rotor sliding assemblies configured in accordance with embodiments of the disclosure prevent all portions of the flexible display 104 from pillowing while preserving the operability and functionality of the flexible display 104 during sliding operations. Embodiments of the disclosure additionally prevent the application of elevated mechanical strains and stresses to the various layers of the flexible display 104.

Figure 7:
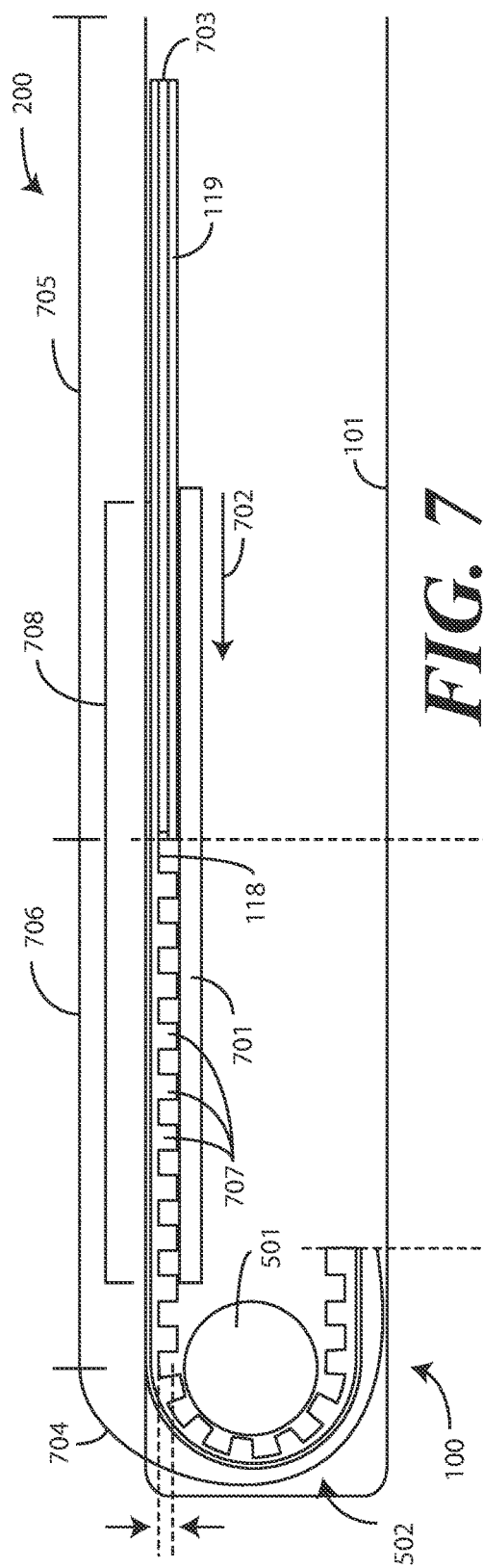
FIG. 7 illustrates a side sectional view of another explanatory flexible display and rotor assembly situated within a device housing of a sliding electronic device when the sliding electronic device is open.

Turning now to FIG. 7, illustrated therein is one explanatory sliding electronic device 100 configured in accordance with one or more embodiments of the disclosure. As before, in one or more embodiments the electronic device 100 includes a first device housing 101 that is configured to slide relative to a second device housing (not shown in FIG. 7 to may visibility of the components clearer) between a closed position (300) and an open position 200. A flexible display 104 is coupled to the first device housing 101 and the second device housing and translates along a translation surface 701 defined by one or both of the first device housing 101 and the second device housing.

In one or more embodiments, a support layer 119 is positioned between a first portion of the flexible display 104 and the translation surface 701. A rotor 501 is positioned within a curvilinear section 502 of the flexible display 104. The rotor 501 causes a linear translation 702 of the support layer 119 across the translation surface 701 by drawing the flexible display 104 around the rotor 501 when the rotor 501 rotates.

In one or more embodiments, the support layer 119 is fixedly coupled to the first portion of the flexible display 104. Illustrating by example, an adhesive layer 703 can be positioned between the support layer 119 and the flexible display 104. Other techniques for coupling the support layer 119 to the flexible display 104 will be obvious to those of ordinary skill in the art having the benefit of this disclosure.

In one or more embodiments, the support layer 119 comprises a rigid, substantially planar support layer. Illustrating by example, the support layer 119 can be manufactured from stainless steel in one or more embodiments. In another embodiment, the support layer 119 is manufactured from a thin, rigid thermoplastic sheet. Other materials can be used in manufacturing the support layer 119 as well. For example, the material nitinol, which is a nickel-titanium alloy, can be used to manufacture the support layer 119. Other rigid, substantially planar materials will be obvious to those of ordinary skill in the art having the benefit of this disclosure.

In one or more embodiments, the display assembly also includes a flexible support structure 118 positioned between the flexible display 104 and the translation surface 701. In one or more embodiments, the flexible support structure 118 is configured with varying support thicknesses across its length. Illustrating by example, in the explanatory embodiment of FIG. 7 the flexible support structure 118 is thinner at portions where it abuts the support layer 119 than at portions where it abuts the translation surface 701.

In one or more embodiments, the flexible support structure 118 defines a first section 704 and a second section 705. In one or more embodiments, the first section 704 defines a first section portion 706 extending from the flexible display 104 to the translation surface 701. Meanwhile, the second section 705 extends from the flexible display 104 to the support layer 119.

The length of the first section portion 706 that is positioned between the flexible display 104 and the translation surface 701 changes when the rotor 501 rotates. Illustrating by example, when the electronic device 100 is in the open position 200 shown in FIG. 7 the first section 704 is longer than in FIG. 8, where the electronic device 100 is in the closed position 300 and the first section portion 706 is shorter.

Figure 8:
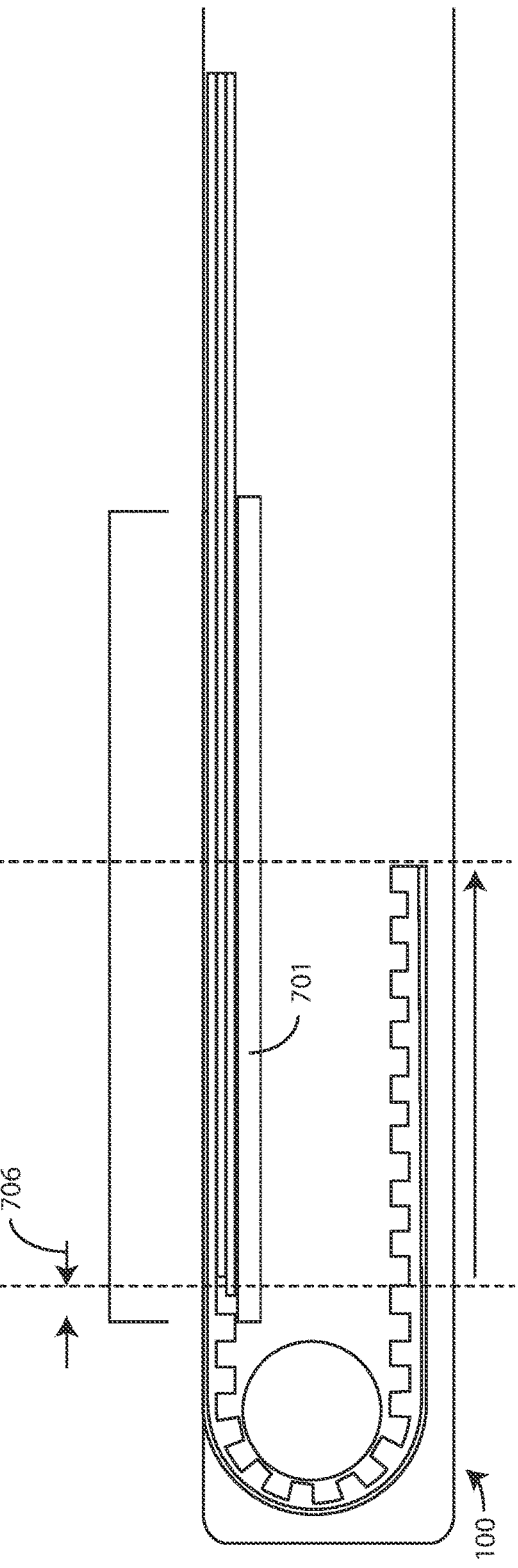
FIG. 8 illustrates a side sectional view the explanatory flexible display and rotor assembly of FIG. 7 situated within a device housing of a sliding electronic device when the sliding electronic device is closed.

Referring again to FIG. 7, in one or more embodiments, the first section 704 defines a plurality of engagement teeth 707. Note that the use of the term "teeth" refers merely to the appearance of these elements as shown in the dental pattern occurring in FIGS. 7-8, and does not imply that a corresponding interlocking mechanism on the rotor 501 engage gaps between the plurality of engagement teeth 707. While the rotor 501 could include a corresponding toothed surface to engage the plurality of engagement teeth 707, in other embodiments its surface is smooth with distal ends of the plurality of engagement teeth 707 simply abutting the surface of the rotor 501 as shown in FIGS. 7-8.

As shown in FIG. 7, in one or more embodiments some engagement teeth abut the translation surface 701, while other engagement teeth abut the rotor 501. By comparing FIGS. 7 and 8, it can be seen that the number of engagement teeth abutting the translation surface 701 is greater when the electronic device 100 is in the open position 200 than when it is in the closed position 300. The number of engagement teeth abutting the rotor 501 stays relatively constant since the rotor 501 has a circular cross section. Accordingly, as the electronic device 100 translates from the closed position 300 to the open position 200, the number of engagement teeth abutting the translation surface 701 increases. By contrast, when the electronic device translates from the open position 200 to the closed position 300, the number of engagement teeth abutting the translation surface 701 decreases.

In one or more embodiments, the second section 705 of the flexible support structure 118 positioned between the support layer 119 and the flexible display 104 is devoid of engagement teeth. In the illustrative embodiment of FIG. 7, the support layer 119 is fixedly coupled to the second section 705 of the flexible support structure 118 by an adhesive.

In one or more embodiments, the flexible support structure 118 is manufactured as a composite structure from different components. For instance, the portion of the flexible support structure 118 positioned against and coupled to the flexible display 104 may be manufactured from a flexible material such as a flexible film, while the plurality of engagement teeth 707 are manufactured from a rigid material such as metal or plastic. In other embodiments, the flexible support structure 118 is a unitary component manufactured from a flexible thermoplastic with the plurality of engagement teeth 707 manufactured by etching. Other configurations for the flexible support structure 118 will be obvious to those of ordinary skill in the art having the benefit of this disclosure.

In one or more embodiments, the plurality of engagement teeth 707 are wider than the flexible display 104. Consequently, as viewed in FIGS. 7 and 8 the plurality of engagement teeth 707 would extend farther into, and out of, the page than would the flexible display 104. The plurality of engagement teeth 707 can be configured this way because the device housing 101 can include one or more housing rails 708 positioned at the sides of the flexible display 104. (For ease of illustration, only one housing rail is shown in FIGS. 7-8. However, two will be shown in FIG. 9 below.) In one or more embodiments, some of the plurality of engagement teeth 707, namely those abutting the translation surface 701 in the illustrative embodiment of FIG. 7, are positioned between the one or more housing rails 708 and the translation surface 701.

Turning briefly to FIGS. 13 and 14, illustrated therein are examples of pluralities of engagement teeth 1307,1407. These examples are illustrative only, as others will be obvious to those of ordinary skill in the art having the benefit of this disclosure.

As shown in FIG. 13, in one or more embodiments the plurality of engagement teeth 1307 are configured as one or more ribs that extend distally across the bottom of the flexible display 104, with ends of the plurality of engagement teeth 1307 being wider than the flexible display 104 itself. However, as shown in FIG. 14, here the plurality of engagement teeth 1407 are configured in a mesh arrangement that spans from left to right in the translation direction of the rotor (501) against which the plurality of engagement teeth 1407 are positioned. In either embodiment, the plurality of engagement teeth 1307,1407 are designed so that the flexible display 104 can flexibly extend around a rotor (501).

Turning back now to FIGS. 7-8, these configurations allow ends of the engagement teeth extending beyond the width of the flexible display 104 to be captured beneath the one or more housing rails 708. Accordingly, those engagement teeth with ends extending beneath the one or more housing rails 708 are retained against the translation surface 701 as the rotor 501. This prevents the flexible display 104 from pillowing above the translation surface 701 as the electronic device 100 transitions to and from the open position 200 and closed position 300.

Accordingly, as shown in FIGS. 7 and 8, in one or more embodiments a flexible support structure 118 is coupled to the flexible display 104 between the flexible display 104 and the translation surface 701. In one or more embodiments, the flexible support structure 118 defines a plurality of engagement teeth 707 along a first section 704 of the flexible support structure 118. In one or more embodiments, each of the engagement teeth of the plurality of engagement teeth 707 extend beyond a width of the flexible display 104. The ends of these engagement teeth then extend under one or more housing rails 708 positioned at the sides of the flexible display 104 to retain the central portions of the engagement teeth abutting the translation surface 701. This causes the flexible display 104 itself to remain flat across the first section portion 706 of the flexible support structure 118.

In one or more embodiments, a rotor 501 engages the first section portion 706 of the flexible support structure 118. By positioning the ends of some engagement teeth of the plurality of engagement teeth 707 under the one or more housing rails 708, the flexible display 104 is prevented from pillowing when the rotor 501 rotates, thereby causing translation of the flexible display 104 along the translation surface 701.

In one or more embodiments, a support layer 119 holding the flexible display 104 in a planar configuration is then coupled to the second section 705 of the flexible support structure 118 between the flexible support structure 118 and the translation surface 701. When the rotor 501 rotates to draw or push the flexible display 104 along the translation surface 701, the support layer 119 translates along the translation surface 701 between the flexible support structure 118 and the translation surface 701 itself.

Since the support layer 119 is rigid in one or more embodiments, the support layer 119 prevents any pillowing of the flexible display 104 during translation. In effect, the first section 704 of the flexible support structure 118 having the plurality of engagement teeth 707 with ends being held captive by the one or more housing rails 708 keeps a first portion of the flexible display 104 from pillowing, while the support layer 119 prevents the other portion of the flexible display 104 from pillowing. The system further protects the flexible display 104 from damage and extends its mean time between failure from sliding operations as well.

Figure 9:
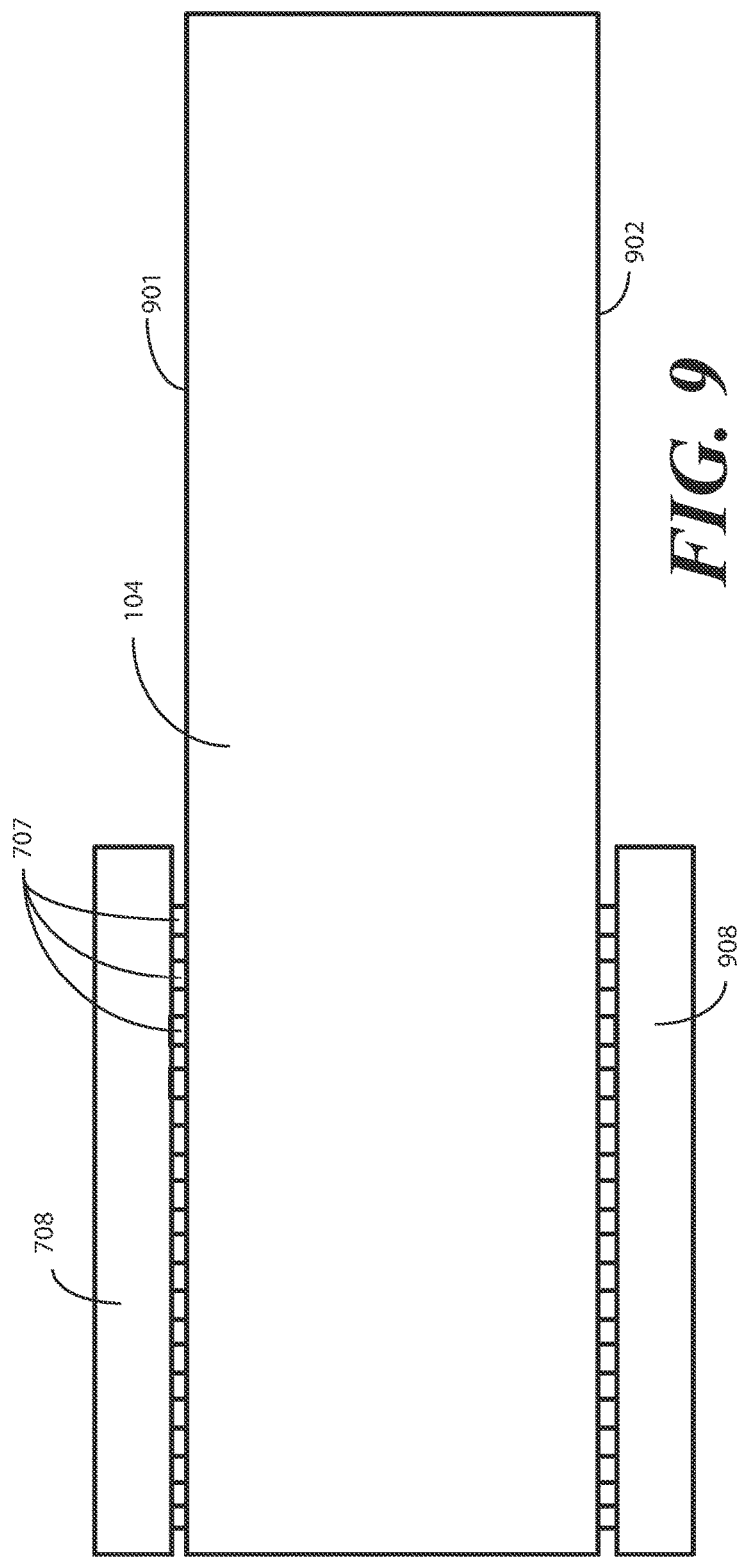
FIG. 9 illustrates a plan view of the explanatory flexible display and rotor assembly of FIG. 7 as would occur when positioned in a sliding electronic device that is open.
Figure 10:
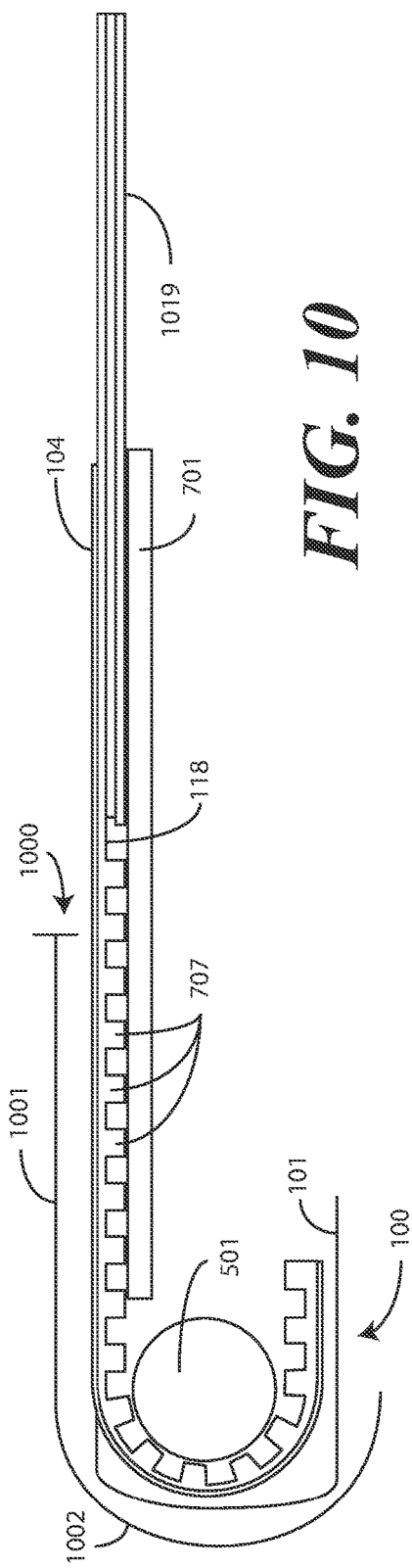
FIG. 10 illustrates a side sectional view of FIG. 9.

Turning now to FIGS. 9 and 10, illustrated therein is another system in accordance with one or more embodiments of the disclosure. The system is suitable for use in an electronic device 100 having a first device housing 101 and a second device housing (102) that can slide relative to each other between an open position (200) and a closed position (300).

As before, the system includes a flexible display 104. A device housing 101 of the electronic device 100 defines a translation surface 701 as previously described. A flexible support structure 118 is coupled to the flexible display 104 between the flexible display 104 and the translation surface 701. The flexible support structure 118 defines a plurality of engagement teeth 707 along a first portion of the flexible support structure 118. As shown in FIG. 9, in one or more embodiments the plurality of engagement teeth 707 each extend beyond sides 901,902 of the flexible display 104 with ends of the plurality of engagement teeth 707 extending under one or more housing rails 708,908 positioned at the sides 901,902 of the flexible display 104 to retain central portions of those engagement teeth abutting the translation surface 701.

In one or more embodiments, a rotor 501 engages the first portion of the flexible support structure 118. When the rotor 501 rotates, the engagement of the flexible support structure 118 and the rotor 501 causes the flexible display 104 to translate along the translation surface 701. By positioning the ends of the engagement teeth passing under the one or more housing rails 708,908, this prevents the flexible display 104 from pillowing when the rotor 501 rotates.

In one or more embodiments, an optional rigid support layer 1019 is coupled to a second portion of the flexible support structure 118. As shown in FIG. 10, the rigid support layer 1019 is coupled to the second portion of the flexible support structure 118 between the flexible support structure 118 and the translation surface. As also shown in FIG. 10, a cross section of the flexible display 104 defines a J-shape 1000 with a curvilinear portion 1001 of the J-shape 1000 wrapped around the rotor 501 and an upper portion 1002 of the J-shape 1000 passing across the translation surface 701.

When the first device housing 101 shown in FIG. 10 is coupled to a second device housing (102) as described above with reference to FIG. 1, and the first device housing 101 and the second device housing (102) slide relative to each other, the flexible display 104 wraps around the rotor 501 to extend further from, or back into, the first device housing 101. When the sliding electronic device 100 opens, the upper portion 1002 of the J-shape 1000 becomes longer as the flexible display 104 wraps around the rotor 501 and extends further out of the first device housing 101. When the sliding electronic device 100 closes, the upper portion 1002 of the J-shape 1000 becomes shorter as the reverse operation occurs. Thus, when the first device housing 101 translates relative to the second device housing (102), the flexible display 104 deforms at different locations as it wraps and passes around the rotor 501.

In one or more embodiments, the rotor 501 not only facilitates the perceived "extension" of the flexible display 104 that occurs during an opening operation, but also works to improve the reliability and usability of the flexible display 104. This is true because the rotor 501 defines a service loop in the curvilinear portion 1001 of the J-shape 1000 about which the flexible display 104 curves. The service loop prevents the flexible display 104 from being damaged or developing memory in the curvilinear portion when the electronic device 100 is in the closed position (300), open position (200), or somewhere in between.

In one or more embodiments the ends of the plurality of engagement teeth 707 extend laterally from sides 901,902 of the flexible display 104 and are held captive by two housing rails 708,908 to keep the flexible display 104 from pillowing. Advantageously, this capture of the plurality of engagement teeth 707 and/or use of the rigid support layer 1019 with the flexible support structure 118 provides a solution for the pillowing issue that can occur when flexible displays are used in extendable and/or slider mechanisms in portable electronic devices such as smartphones.

In one or more embodiments, the pillowing problem is addressed by including the flexible support structure 118 with its plurality of engagement teeth 707 that provides stiffness along the width of the flexible display 104 but still allows the flexible display 104 to flex around the rotor 501. The advantageous usage of the engagement teeth in one portion of the flexible support structure 118 while a rigid support layer 1019 is coupled to another section of the flexible support structure 118 allows the former to be held captive by the housing rails 708,908 to prevent pillowing, while the rigid support layer 1019 prevents pillowing of portions of the flexible display that do not wrap around the rotor 501 during the sliding operation.

Figure 11:
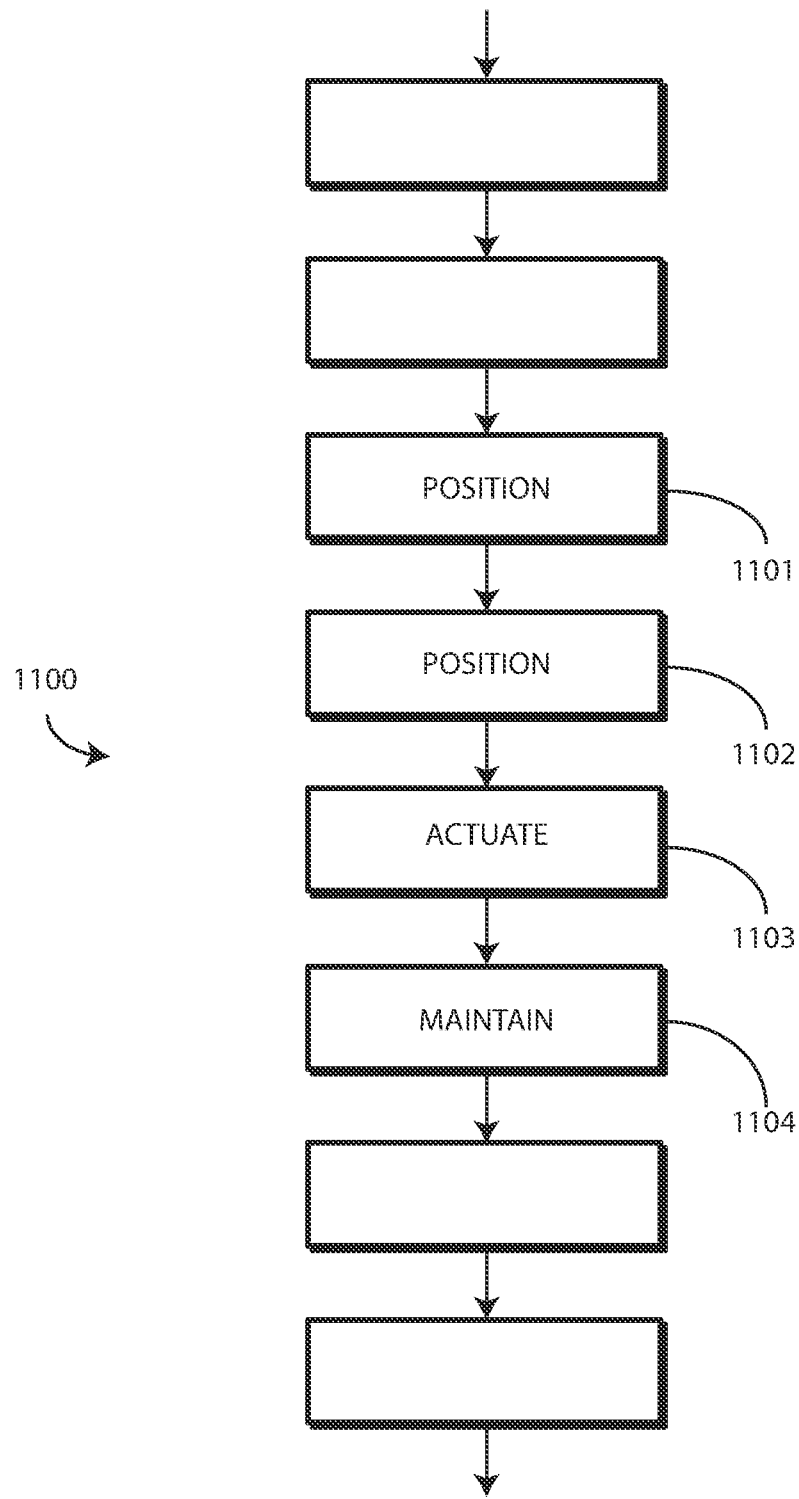
FIG. 11 illustrates one explanatory method in accordance with one or more embodiments of the disclosure.

Turning now to FIG. 11, illustrated therein is one explanatory method 1100 for preventing a flexible display from pillowing in a sliding electronic device. Beginning at step 1101, the method 1100 includes positioning one or more engagement teeth that are wider than a flexible display between a first portion of the flexible display and a translation surface of a device housing with ends extending distally away from sides of the flexible display positioned beneath one or more housing rails positioned at the sides of the flexible display. In one or more embodiments, the one or more engagement teeth are coupled to a flexible support structure having an extension portion devoid of engagement teeth positioned between the support layer and the second portion of the flexible display.

At step 1102, the method 1100 includes positioning a support layer between a second portion of the flexible display and the translation surface.

At step 1103, the method 1100 includes actuating a rotor. In one or more embodiments, actuation of the rotor causes a translation of a flexible display linearly along a translation surface of a device housing and around the rotor. In one or more embodiments, the support layer translates across the translation surface when the rotor rotates.

At step 1104, the method 1100 maintains a predefined distance (one example of which is shown in FIG. 7) between the flexible display and the translation surface while the rotor is actuated. In one or more embodiments, the positioning of the one or more engagement teeth that are wider than the flexible display between the first portion of the flexible display and the translation surface with ends extending distally away from sides of the flexible display positioned beneath the one or more housing rails positioned at the sides of the flexible display is what maintains the predefined distance between the flexible display and the translation surface when the rotor rotates.

Figure 12:
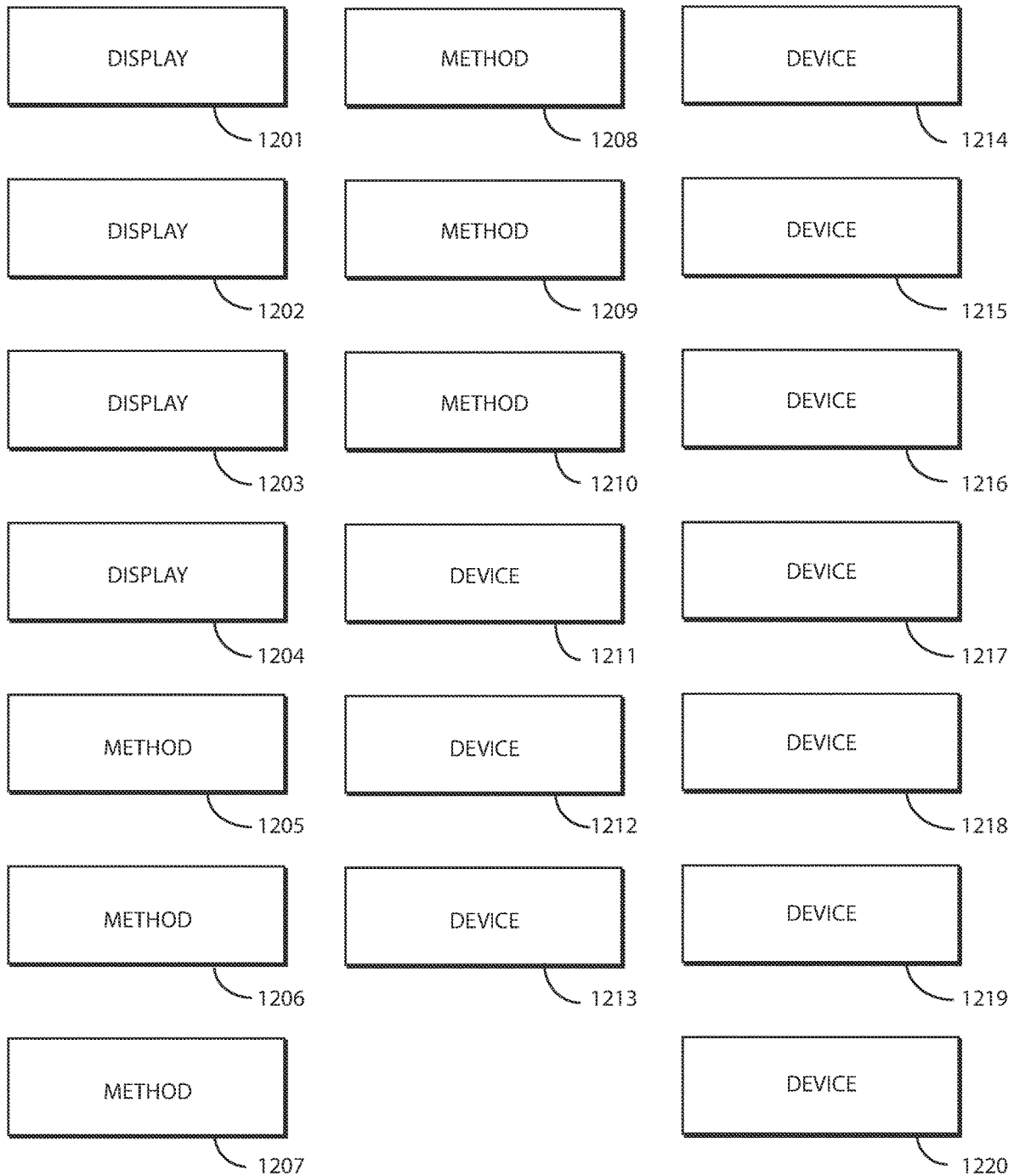
FIG. 12 various embodiments of the disclosure.

Turning now to FIG. 12, illustrated therein are various embodiments of the disclosure. The embodiments of FIG. 12 are shown as labeled boxes in FIG. 12 due to the fact that the individual components of these embodiments have been illustrated in detail in FIGS. 1-11, which precede FIG. 12. Accordingly, since these items have previously been illustrated and described, their repeated illustration is no longer essential for a proper understanding of these embodiments. Thus, the embodiments are shown as labeled boxes.

Beginning at 1201, an electronic device comprises a flexible display. At 1201, the electronic device comprises a device housing comprising a translation surface for the flexible display.

At 1201, the electronic device comprises a support layer positioned between a portion of the flexible display and the translation surface. At 1201, the electronic device comprises a rotor positioned within a curvilinear section of the flexible display. At 1201, the rotor causes a linear translation of the support layer across the translation surface by drawing the flexible display around the rotor when the rotor rotates.

At 1202, the support layer of 1201 is fixedly coupled to the portion of the flexible display. At 1203, the support layer of 1202 is a rigid, substantially planar support layer.

At 1204, the electronic device of 1203 further comprises a flexible support structure positioned between the flexible display and the translation surface. At 1205, the flexible support structure of 1204 defines a first section extending from the flexible display to the translation surface and a second section extending from the flexible display to the support layer.

At 1206, the flexible substrate of 1205 defines a plurality of engagement teeth, with some engagement teeth abutting the translation surface and some other engagement teeth abutting the rotor. At 1207, the second section of 1206 is devoid of engagement teeth. At 1208, the support layer of 1207 is fixedly coupled to the second section.

At 1209, the plurality of engagement teeth of 1206 are each wider than the flexible display. At 1210, the device housing of 1209 further comprises one or more housing rails positioned at sides of the flexible display. At 1210, some engagement teeth are positioned between the housing rails and the translation surface.

At 1211, the device housing of 1209 further comprises one or more housing rails positioned at sides of the flexible display. At 1211, the one or more housing rails retain some engagement teeth against the translation surface as the rotor rotates.

At 1212, a method in an electronic device comprises actuating a rotor, thereby causing translation of a flexible display linearly along a translation surface of a device housing and around the rotor. At 1212, the method comprises maintaining a predefined distance between the flexible display and the translation surface while the rotor is actuated.

At 1213, the method of 1213 further comprises positioning one or more engagement teeth that are wider than the flexible display between a first portion of the flexible display and the translation surface with ends extending distally away from sides of the flexible display positioned beneath one or more housing rails positioned at the sides of the flexible display to maintain the predefined distance between the flexible display and the translation surface when the rotor rotates.

At 1214, the method of 1213 further comprises positioning a support layer between a second portion of the flexible display and the translation surface such that the support layer translates across the translation surface when the rotor rotates. At 1215, the one or more engagement teeth of 1214 are coupled to a flexible support structure having an extension portion devoid of engagement teeth positioned between the support layer and the second portion of the flexible display.

At 1216, an electronic device comprises a flexible display. At 1216, the electronic device comprises a device housing defining a translation surface.

At 1216, the electronic device comprises a flexible support structure coupled to the flexible display between the flexible display and the translation surface. At 1216, the flexible support structure defines a plurality of engagement teeth along a first portion of the flexible support structure that extend beyond sides of the flexible display with ends of the engagement teeth extending under one or more housing rails positioned at the sides of the flexible display that retain central portions of the engagement teeth against the translation surface.

At 1217, the electronic device of 1216 further comprises a rotor engaging the first portion of the flexible support structure. At 1217, positioning the ends of the engagement teeth under the one or more housing rails prevents the flexible display from pillowing when the rotor rotates, thereby causing translation of the flexible display along the translation surface.

At 1218, the electronic device of 1217 further comprises a rigid support layer coupled to a second portion of the flexible support structure between the flexible support structure and the translation surface.

At 1219, a cross section of the flexible display of 1217 defines a J-shape with a curved portion of the J-shape wrapped around the rotor and an upper portion of the J-shape passing across the translation surface. At 1220, the electronic device of 1218 further comprises another device housing coupled to the flexible display that translates into the device housing when the rotor draws a section of the flexible display coupled to the rigid support layer toward the rotor.

In the foregoing specification, specific embodiments of the present disclosure have been described. However, one of ordinary skill in the art appreciates that various modifications and changes can be made without departing from the scope of the present disclosure as set forth in the claims below. Thus, while preferred embodiments of the disclosure have been illustrated and described, it is clear that the disclosure is not so limited. Numerous modifications, changes, variations, substitutions, and equivalents will occur to those skilled in the art without departing from the spirit and scope of the present disclosure as defined by the following claims.

For example, friction between the plurality of engagement teeth and the translation surface can be reduced by coating the plurality of engagement teeth with a friction reducing coating. Such a coating may additionally leave the plurality of engagement teeth less prone to deterioration. Moreover, while the plurality of engagement teeth were shown with generally rectangular cross sections in one illustrative embodiment, they could be configured with other unique edge geometries that allow them to be less prone to tolerance issues. They could be thicker or thinner as shown as well. Since the plurality of engagement teeth isolate the active bending area, they advantageously reduce force loading and stressing along the bendable portions of the flexible display. The inclusion of the plurality of engagement teeth prevent central sections of the flexible display from pillowing despite the fact that only the ends of the plurality of engagement teeth are captured beneath the one or more housing rails.

Accordingly, the specification and figures are to be regarded in an illustrative rather than a restrictive sense, and all such modifications are intended to be included within the scope of present disclosure. The benefits, advantages, solutions to problems, and any element(s) that may cause any benefit, advantage, or solution to occur or become more pronounced are not to be construed as a critical, required, or essential features or elements of any or all the claims.

What is claimed is:

1. An electronic device, comprising:
   a flexible display;
   a device housing comprising a translation surface for the flexible display;
   a support layer positioned between a portion of the flexible display and the translation surface; and
   a rotor positioned within a curvilinear section of the flexible display and causing a linear translation of the support layer across the translation surface by drawing the flexible display around the rotor when the rotor rotates.

2. The electronic device of claim 1, wherein the support layer is fixedly coupled to the portion of the flexible display.

3. The electronic device of claim 2, wherein the support layer is a rigid, substantially planar support layer.

4. The electronic device of claim 3, further comprising a flexible support structure positioned between the flexible display and the translation surface.

5. The electronic device of claim 4, the flexible support structure defining a first section extending from the flexible display to the translation surface and a second section extending from the flexible display to the support layer.

6. The electronic device of claim 5, the first section defining a plurality of engagement teeth, with some engagement teeth abutting the translation surface and some other engagement teeth abutting the rotor.

7. The electronic device of claim 6, wherein the second section is devoid of engagement teeth.

8. The electronic device of claim 7, wherein the support layer is fixedly coupled to the second section.

9. The electronic device of claim 6, wherein the plurality of engagement teeth are wider than the flexible display.

10. The electronic device of claim 9, the device housing further comprising one or more housing rails positioned at sides of the flexible display, wherein the some engagement teeth are positioned between the housing rails and the translation surface.

11. The electronic device of claim 9, the device housing further comprising one or more housing rails positioned at sides of the flexible display, the one or more housing rails retaining the some engagement teeth against the translation surface as the rotor rotates.

12. A method in an electronic device, the method comprising:
    actuating a rotor, thereby causing translation of a flexible display linearly along a translation surface of a device housing and around the rotor;
    maintaining a predefined distance between the flexible display and the translation surface while the rotor is actuated; and
    positioning one or more engagement teeth that are wider than the flexible display between a first portion of the flexible display and the translation surface.

13. The method of claim 12, the positioning the one or more engagement teeth that are wider than the flexible display between the first portion of the flexible display and the translation surface causing ends extending distally away from sides of the flexible display to be positioned beneath one or more housing rails positioned at the sides of the flexible display to maintain the predefined distance between the flexible display and the translation surface when the rotor rotates.

14. The method of claim 13, further comprising positioning a support layer between a second portion of the flexible display and the translation surface such that the support layer translates across the translation surface when the rotor rotates.

15. The method of claim 14, wherein the one or more engagement teeth are coupled to a flexible support structure having an extension portion devoid of engagement teeth positioned between the support layer and the second portion of the flexible display.

16. An electronic device, comprising:
a flexible display;
a device housing defining a translation surface;
a flexible support structure coupled to the flexible display between the flexible display and the translation surface and defining a plurality of engagement teeth along a first portion of the flexible support structure that extend beyond sides of the flexible display with ends of the engagement teeth extending under one or more housing rails positioned at the sides of the flexible display that retain central portions of the engagement teeth against the translation surface.

17. The electronic device of claim 16, further comprising a rotor engaging the first portion of the flexible support structure, wherein positioning the ends of the engagement teeth under the one or more housing rails prevent the flexible display from pillowing when the rotor rotates, thereby causing translation of the flexible display along the translation surface.

18. The electronic device of claim 17, further comprising a rigid support layer coupled to a second portion of the flexible support structure between the flexible support structure and the translation surface.

19. The electronic device of claim 18, wherein a cross section of the flexible display defines a J-shape with a curved portion of the J-shape wrapped around the rotor and an upper portion of the J-shape passing across the translation surface.

20. The electronic device of claim 18, further comprising another device housing coupled to the flexible display that translates into the device housing when the rotor draws a section of the flexible display coupled to the rigid support layer toward the rotor.

* * * * *